(12) United States Patent
Ogawa et al.

(10) Patent No.: US 7,218,843 B2
(45) Date of Patent: *May 15, 2007

(54) RECORDING APPARATUS AND REPRODUCING APPARATUS

(75) Inventors: Tetsuo Ogawa, Kanagawa (JP); Hiroki Kotani, Tokyo (JP)

(73) Assignee: Sony Corporation, Tokyo (JP)

( * ) Notice: Subject to any disclaimer, the term of this patent is extended or adjusted under 35 U.S.C. 154(b) by 144 days.

This patent is subject to a terminal disclaimer.

(21) Appl. No.: 11/118,522

(22) Filed: Apr. 29, 2005

(65) Prior Publication Data

US 2005/0191038 A1 Sep. 1, 2005

Related U.S. Application Data

(63) Continuation of application No. 09/910,102, filed on Jul. 20, 2001, now Pat. No. 7,058,288, which is a continuation of application No. 08/687,360, filed on Aug. 2, 1996, now abandoned.

(51) Int. Cl.
*H04N 7/26* (2006.01)
*H04N 5/91* (2006.01)

(52) U.S. Cl. .................................. 386/109; 386/68

(58) Field of Classification Search ............ 386/109, 386/111, 112, 68, 67, 80, 6, 7, 27, 33
See application file for complete search history.

(56) References Cited

U.S. PATENT DOCUMENTS

| | | | |
|---|---|---|---|
| 4,122,498 A | 10/1978 | Dyer | |
| 4,963,991 A | 10/1990 | Honjo | |
| 5,122,875 A | 6/1992 | Raychaudhuri et al. | |
| 5,136,391 A | 8/1992 | Minami | |
| 5,317,413 A | 5/1994 | Yanagihara | |
| 5,335,116 A | 8/1994 | Onishi et al. | |
| 5,465,180 A * | 11/1995 | Amada et al. ............... | 386/99 |
| 5,530,598 A | 6/1996 | Arai et al. | |
| 5,537,409 A | 7/1996 | Moriyama et al. | |
| 5,576,758 A | 11/1996 | Arai et al. | |
| 5,585,933 A | 12/1996 | Ichige et al. | |

FOREIGN PATENT DOCUMENTS

| | | |
|---|---|---|
| EP | 0 487 294 A2 | 11/1991 |
| EP | 0 629 087 A2 | 6/1994 |
| EP | 0 673 173 A1 | 3/1995 |

(Continued)

*Primary Examiner*—Robert Chevalier
(74) *Attorney, Agent, or Firm*—Frommer Lawrence & Haug LLP; William S. Frommer

(57) ABSTRACT

It is an object of the present invention to provide a recording apparatus and a reproducing apparatus which change a picture compression rate depending upon a picture quality of a source which a user desires to retain, thereby a tape storage space being secured. A video-data compression rate N used by a 1:N video-data compression encoder 3 and a 1:N video-data compression decoder 6 is changed depending upon a picture quality set by a device 5 for setting a picture quality that a user desires. A tape travel speed of an archive VTR 4 is changed in response to the picture compression rate. Thus, an amount of a tape travel is optionally set depending upon a level of the picture quality. Therefore, it is possible to optionally select a tape storage space in response to the level of the picture quality.

1 Claim, 17 Drawing Sheets

Compression Rate of Video Data
Recording Time of DIR-1000
( Upon use of a tape having a length of 1,330m )

| | | Tape Travel Speed of DIR-1000 [ mm/s ] |
|---|---|---|
| 100 | 1 | 211.9 |
| 200 | 1/2 | 105.9 |
| 400 | 1/4 | 53.0 |
| 800 | 1/8 | 26.5 |
| 1200 | 1/12 | 17.7 |
| 1600 | 1/16 | 13.2 |

FOREIGN PATENT DOCUMENTS

| | | |
|---|---|---|
| JP | 62-269485 | 11/1987 |
| JP | 64-35702 | 2/1989 |
| JP | 3-213072 | 9/1991 |
| JP | 4-984 | 1/1992 |
| JP | 4-68884 | 3/1992 |
| JP | 4-337989 | 11/1992 |

\* cited by examiner

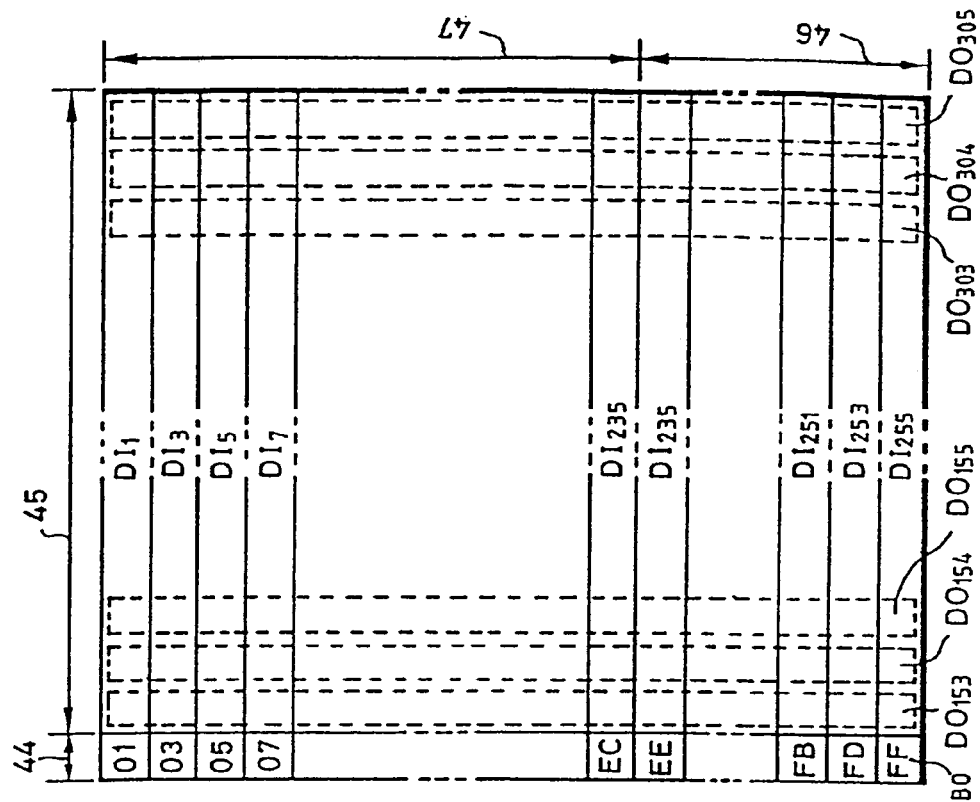
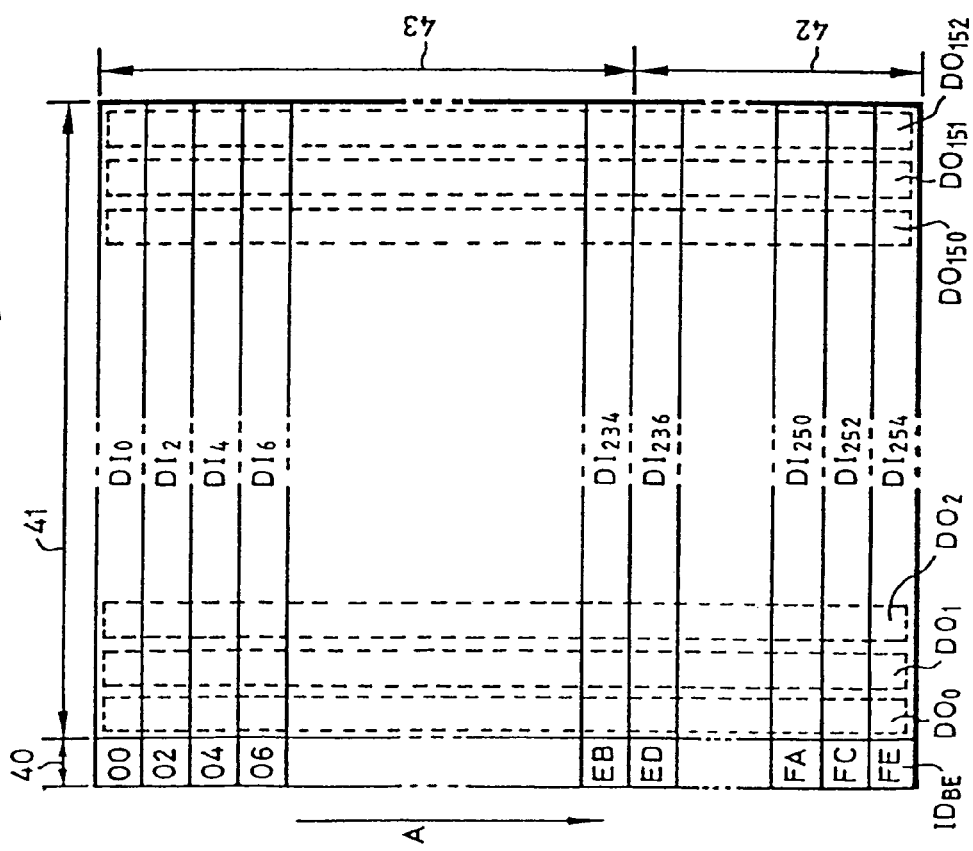
FIG. 4

| Recording Rate of DIR-1000 | Tape Travel Speed of DIR-1000 [mm/s] |
|---|---|
| 1 | 423.8 |
| 1/2 | 211.9 |
| 1/4 | 105.9 |
| 1/8 | 53.0 |
| 1/16 | 26.5 |
| 1/24 | 17.7 |
| 1/32 | 13.2 |

FIG.10

( Upon use of a tape having a length of 1,330m )

| Recording Time of DIR-1000 | Compression Rate of Video Data | Tape Travel Speed of DIR-1000 [mm/s] |
|---|---|---|
| 100 | 1 | 211.9 |
| 200 | 1/2 | 105.9 |
| 400 | 1/4 | 53.0 |
| 800 | 1/8 | 26.5 |
| 1200 | 1/12 | 17.7 |
| 1600 | 1/16 | 13.2 |

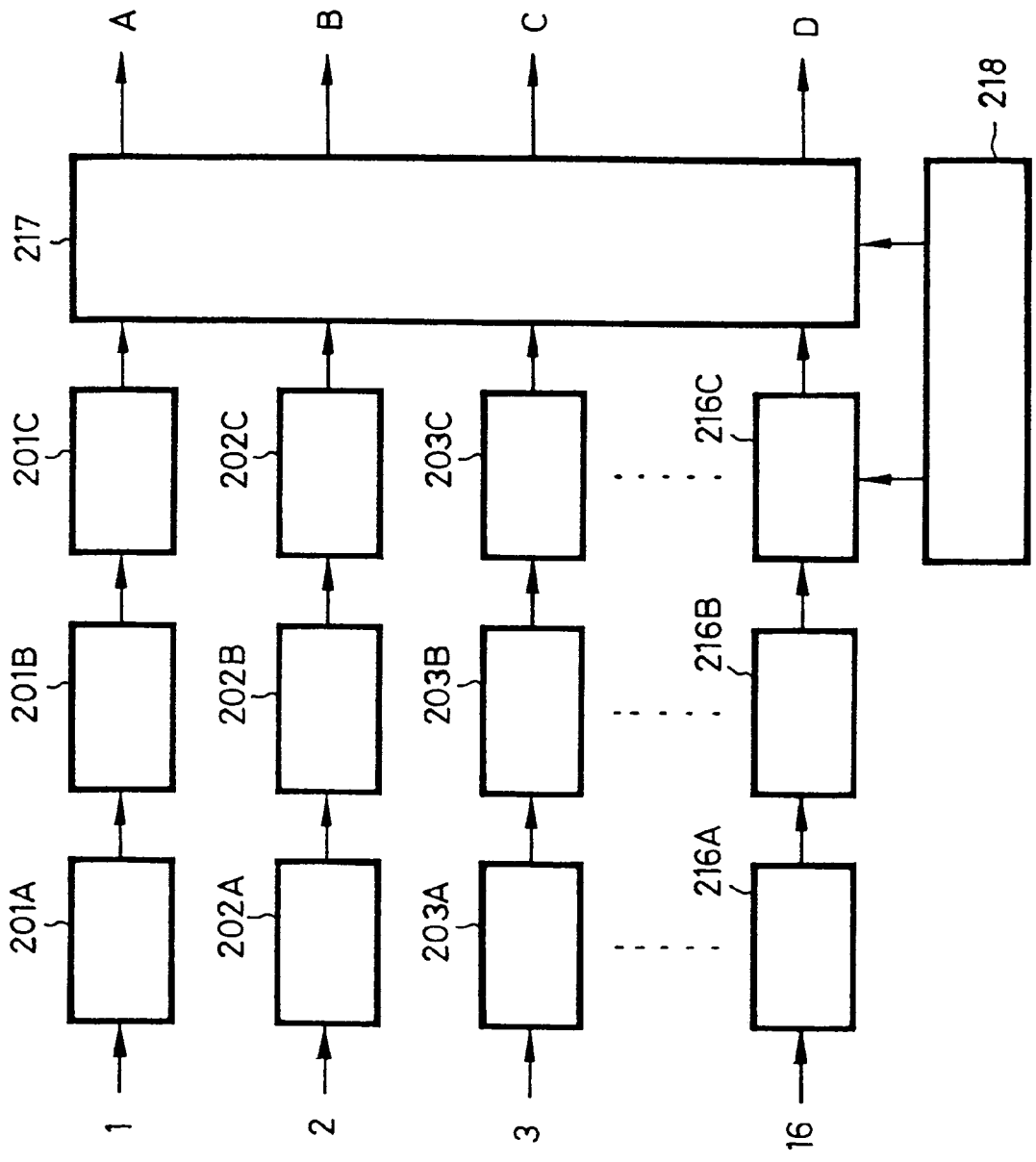

RECORDING APPARATUS AND REPRODUCING APPARATUS

This is a continuation of application Ser. No. 09/910,102 filed Jul. 20, 2001, now U.S. Pat. No. 7,058,288 which is a continuation of U.S. patent application Ser. No. 08/687,360 filed Aug. 2, 1996, now abandoned. Application Ser. No. 09/910,102 is hereby incorporated by reference in its entirety herein.

TECHNICAL FIELD

The present invention relates to a recording apparatus and a reproducing apparatus suitable for use in the archiving for keeping a source tape retained for reproduction in a broadcasting station or the like.

BACKGROUND ART

In the prior art, a television broadcasting station, a production house and so on have retained a tape on which a broadcasting program is recorded by using the same tape as an original source tape and the same format.

Therefore, if different formats are employed, video tape recorders (VTRs) and their peripheral equipments of many kinds corresponding to the original formats must be prepared for the archiving of keeping the source tape retained for reproduction, and must always be maintained.

Some of such-equipments are old type ones which are difficult to be maintained. For example, a type-B VTR is one of such equipments.

Since such archiving requires the tapes which are as much as the source tapes, a sufficient retention place used for retaining the tapes must be prepared.

In such conventional archiving system, since the archiving is carried out by using the same tape as the source tape and the same format, there is then the disadvantage that if different formats are employed, video tape recorders and their peripheral equipments of many kinds corresponding to the original formats must be prepared for the archiving of keeping the source tape retained for reproduction, and must always be maintained.

In the conventional archiving system, since its archiving requires the tapes which are as much as the source tapes, a sufficient retention place used for retaining the tapes must be prepared.

DISCLOSURE OF THE INVENTION

The present invention is made in view of such aspects, and its first object is to provide a recording apparatus and a reproducing apparatus which change a picture compression rate depending upon a picture quality of a source which a user desires to retain, thereby a tape retention space being secured.

The present invention is made in view of such aspects, and its second object is to provide a reproducing apparatus which reduces a time for recording a data string and allows a high-speed reproduction.

A recording apparatus according to a first invention includes a video-data supply means for supplying a video data, a compression means for compressing the video data, a setting means for setting a compression rate used in the compression means, a control means for controlling a travel speed of a recording medium so that the recording medium should be traveled at a speed corresponding to the compression rate set by the setting means, and a recording means for recording the video data compressed by the compression means on the recording medium. Therefore, it is possible to optionally select a tape retention space by changing a tape travel speed in response to the video-data compression rate.

According to a recording apparatus of a second invention, the control means controls a speed of the recording medium so that a value of the compression rate set by the setting means and the speed of the recording medium should be in proportion to each other. Therefore, the video-data compression rate and the recording speed of the recording medium are in proportion to each other, which allows a recording time to be increased in proportion to them.

According to a recording apparatus of a third invention, the control means controls the speed of the recording medium so that, when the compression rate set by the setting means is an inverse number of N (where N>1), the speed of the recording medium should be set to a speed obtained by multiplying the speed by an inverse number of N. Therefore, the video-data compression rate and the recording speed of the recording medium are set the same, which allows a recording time to be increased in proportion to them.

According to a recording apparatus of a fourth invention, the recording means records a compression rate data indicating the video-data compression rate at the compression means on the recording medium. Therefore, the data of the compression rate set upon the recording can be reproduced from the recording medium upon reproduction.

According to a recording apparatus of a fifth invention, the recording means records a recording speed data indicating a recording speed of the video data at the recording means on the recording medium. Therefore, the data of the recording speed set upon the recording can be reproduced from the recording medium upon reproduction.

According to a recording apparatus of a sixth invention, the recording means records a source ID data indicating the video data on the recording medium. Therefore, the data of the source ID data set upon the recording can be reproduced from the recording medium upon reproduction.

According to a recording apparatus of a seventh invention, the video-data supply means supplies a plurality of video data and the recording means records the plurality of video data compressed by the compression means on respective channels of the recording medium. Therefore, it is possible to record a plurality of compressed data strings on the recording medium with the data strings corresponding to specific channels.

A reproducing apparatus according to an eighth invention is a reproducing apparatus for reproducing a video data from a recording medium on which the video data and a travel-speed data indicating a travel speed of a recording medium obtained when the video data is recorded thereon, including a reproducing means for reproducing the video data and the travel-speed data from the recording medium, a control means for controlling the travel speed of the recording medium so that the recording medium should be traveled at a travel speed corresponding to the reproduced travel-speed data, and an expanding means for expanding the reproduced video data at an expansion rate corresponding to the travel speed data. Therefore, it is possible to reproduce the video data at a travel speed corresponding to the travel-speed data recorded on the video data upon the recording and it is possible to expand the video data at the expansion rate corresponding to the travel-speed data.

BRIEF DESCRIPTION OF DRAWINGS

FIG. 4 is a diagram showing memories MEM1, MEM2 of an arrangement of a memory of the recording system of the data recorder used in the archive VTR of the embodiment of the recording apparatus and reproducing apparatus according to the present invention;

FIG. 8A is a diagram of one track of a recording information of the embodiment of the recording apparatus and reproducing apparatus according to the present invention, and FIG. 8B is a block diagram of one sync. block of the recording information of the embodiment of the recording apparatus and reproducing apparatus according to the present invention;

FIG. 9 is a diagram showing a relationship between a recording rate and a tape travel speed according to the embodiment of the recording apparatus and reproducing apparatus according to the present invention;

FIG. 10 is a diagram showing a relationship among the recording time, a compression rate and the tape travel speed of the embodiment of the recording apparatus and reproducing apparatus according to the present invention;

FIG. 12 is a block diagram of the recording apparatus of another embodiment of the recording apparatus and reproducing apparatus according to the present invention;

BEST MODE CARRYING OUT THE INVENTION

Figure 1A:
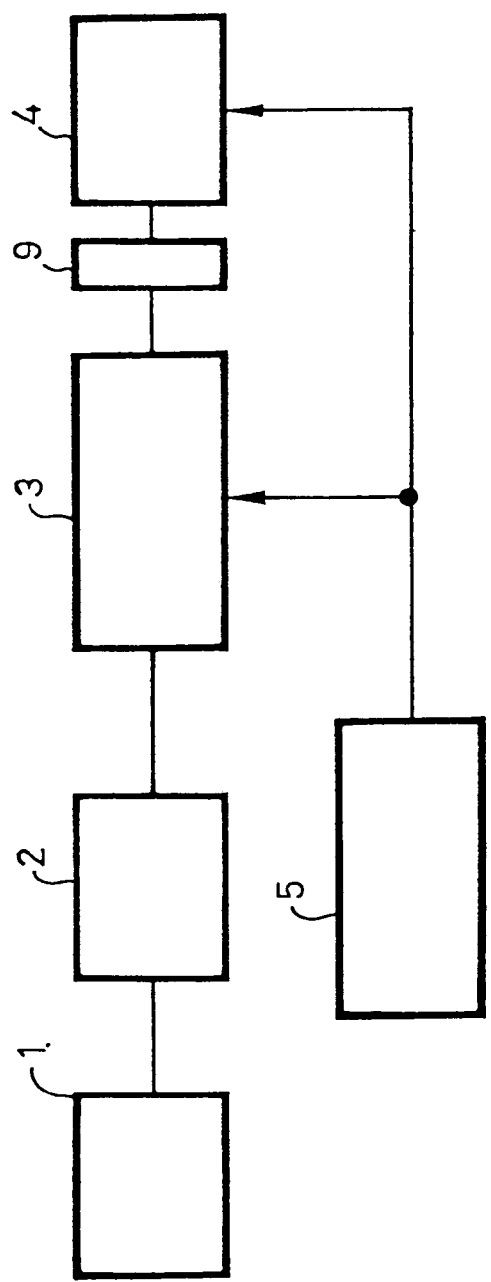
FIG. 1A is a block diagram showing an embodiment of a recording apparatus according to the present invention.

FIG. 1A is a block diagram showing an embodiment of a recording apparatus according to the present invention. As shown in FIG. 1A, a source reproducing VTR 1 reproduces an existing source tape in accordance with an existing format; e.g., it is a 1-inch omega VTR or the like. An A/D converter 2 converts a video data reproduced by the source reproducing VTR 1 into a digital value.

A 1:N video-data compression encoder 3 is a bit reduction encoder for compressing the video data in ratio of 1:N (where N is variable and needs not be an integer). At this time, a value of N is set depending upon a requested picture quality set by a device 5 for inputting and setting a picture quality that a user desires.

A formatter 9 converts a format of the video data reproduced by the source reproducing VTR 1 into a data format of an archive VTR 4. The formatter temporarily writes the converted video data in a buffer memory incorporated therein and reads the video data written in the buffer memory, thereby supplying the video data to the archive VTR 4.

The archive VTR 4 further serves as a VTR for recording the video data compressed by the 1:N video-data compression encoder 3 on a tape. At this time, a tape travel speed obtained when the archive VTR 4 records data is set in accordance with a value of a compression rate N of the video data compressed by the 1:N video data compression encoder 3 The value of the compression rate N of the video data, a recording channel and the tape travel speed obtained upon the recording are recorded in a user bit on a time code track. Alternatively, the value of the compression rate N of the video data and the recording channel may be recorded in the user bit on the time code track with the corresponding tape travel speed being calculated from the compression rate N of the video data. The archive VTR 4 is controlled so that, by changing not only its tape speed and but also its drum rotation speed, its frequency should be set the same as a frequency used when the tape was recorded.

Figure 1B:
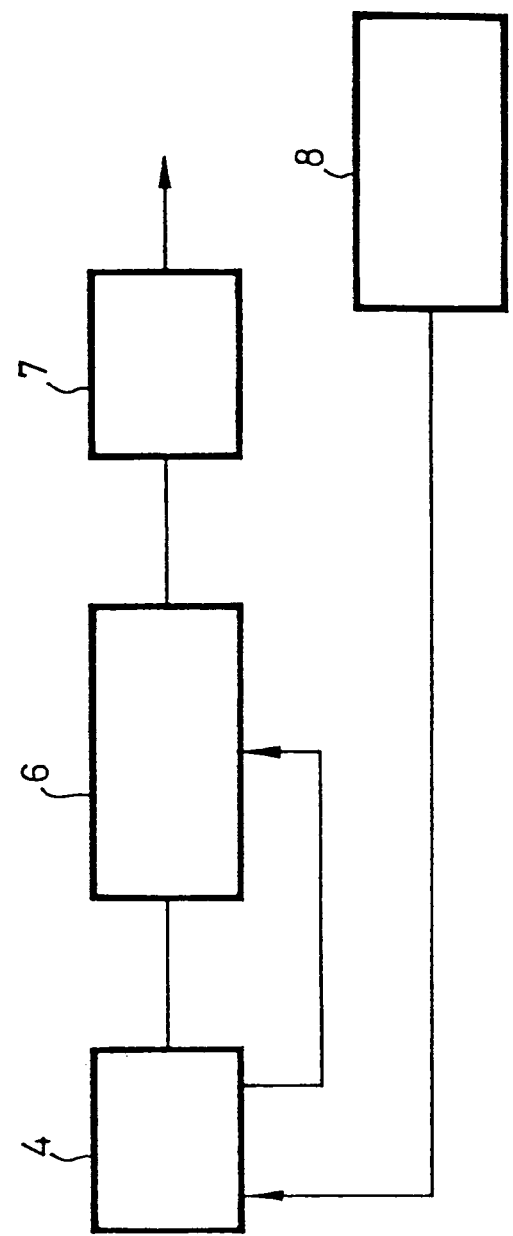
FIG. 1B is a block diagram showing an embodiment of a reproducing apparatus according to the present invention.

FIG. 1B is a block diagram of one embodiment of the reproducing apparatus according to the present invention.

As shown in FIG. 1B, the archive VTR 4 reproduces a video data. At this time, the archive VTR reads out a tape travel speed used when the video data was recorded, from the user bit on the time code track, and reproduces the video data at the tape travel speed. The user sets a channel by a device 8 for inputting and setting a channel that the user desires and the archive VTR retrieves an ID identifying a source to forwards the tape to that position. Then, the archive VTR reproduces the video data.

A 1:N video-data compression decoder 6 is a decoder for expanding a video data compressed in the compression rate N of the video data in order to restore to an original picture the compressed video data reproduced by the archive VTR 4. At this time, when the archive VTR 4 reproduces the video data, the archive VTR detects the value of the compression rate N of the video data compressed by the 1:N video-data compression encoder 3 and recorded in the user bit on the time code track, and the 1:N video data compression decoder 6 expands the compressed video data based on the detected value so that its data amount should be N times as much as that of the data. Then, it is possible to obtain the reproduced picture converted by a D/A converter 7 into an analog value.

Figure 2:
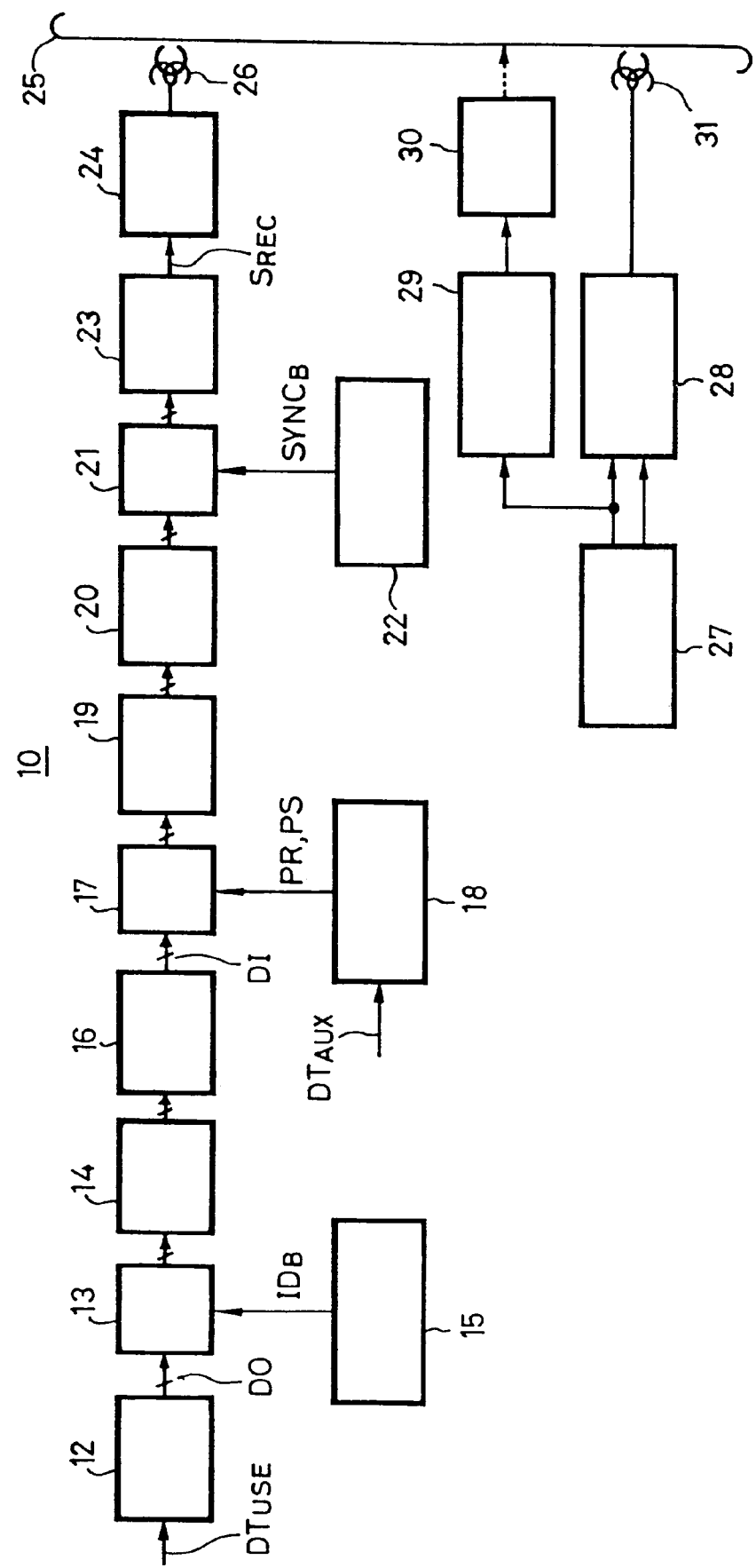
FIG. 2 is a block diagram of a recording system of a data recorder used in an archive VTR of the embodiment of the recording apparatus and the reproducing apparatus according to the present invention.

FIG. 2 shows an arrangement of a recording system of a data recorder of an ID-1 format as the archive VTR. The ID-1 format is based on an ID-1 format of ANSI (AMERICAN NATIONAL STANDARD 19 mm TYPE ID-1 INSTRUMENTATION DIGITAL CASSETTE FORMAT) and determined with reference to a D-1 format of a component digital VTR.

The recording system subjects an input information data to an error correction coding of a product code type and then records them.

Figure 3:
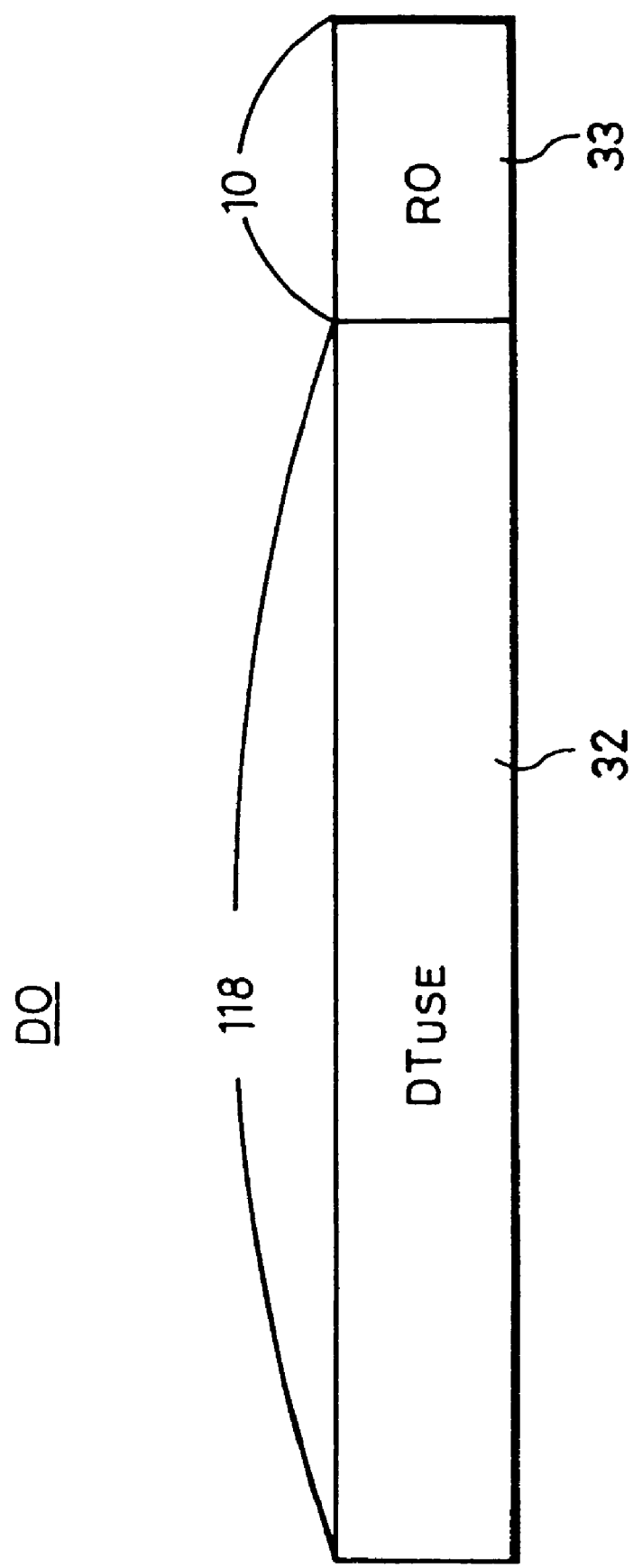
FIG. 3 is a diagram showing an outer data block DO output from an outer error code generating circuit of the recording system of the data recorder used in the archive VTR of the embodiment of the recording apparatus and reproducing apparatus according to the present invention.

An outline of operations of respective circuits therein is as follows. The recording system corresponds to the archive VTR 4 shown in FIG. 1A. Initially, an input information data $DT_{USE}$ formed of 8 bits as a video data supplied from the formatter 9 shown in FIG. 1A is input to an outer error code generating circuit 12. As shown in FIG. 3, the outer error code generating circuit 12 generates, with respect to each of data blocks each formed of 118 bytes of the input information data $DT_{USE}$ as a source data 32, parity codes $RO_0$ to $RO_{305}$ each formed of 10-byte Reed-Solomon code as an outer error code (outer error code) 33 by using a predetermined generating polynomial, and adds the parity codes to each of the data blocks to output them as an outer data block DO. The outer data block DO is supplied through a first multiplexer 13 to a memory 14. FIG. 4 shows an arrangement of the memory 14 and a data arrangement in the memory 14.

As shown in FIG. 4, the memory 14 is formed of memories MEM1, MEM2 which respectively have in rows blocks ID40, ID44 each having 1 byte and input information data 41, 45 each having 153 bytes and have in columns outer error codes 42, 46 each having 10 bytes and input information data 43, 47 each having 118 bytes. The successively input outer data blocks $DO_0$ to $DO_{152}$ of 153 block amounts are written in the memory MEM1 with data of one outer data block amount being written in one column, and the output data blocks $DO_{153}$ to $DO_{305}$ of 153 block amounts successively input after the outer data blocks $DO_0$ to $DO_{152}$ are written in the memory MEM2 with data of one outer data block amount being written in one column.

An information data 43 of one outer data block is formed of 118 bytes. Since the information data of 153 outer data block amount are written in each of the memories MEM1, MEM2, the information data of a value obtained from calculation of 118×153×2 bytes, i.e., 36,108 bytes are written in the memory 14.

When the data are written in each of columns of the memories MEM1, MEM2, the data are written in the direction A shown in FIG. 4. Lowest 10 bytes of the memories MEM1, MEM2 correspond to the outer error codes 42, 46, respectively.

The memory 14 is supplied through the first multiplexer circuit 13 with a data block identification data $ID_B$ which is a data generated by an identification data generating circuit 15 and used for identifying each of rows of the memories MEM1, MEM2. Even-numbered data $ID_{BE}$ of the data block identification data $ID_B$ are written in the memory MEM1 in the order shown by the direction A, and odd-numbered data $ID_{BO}$ thereof are written in the memory MEM2 in the same order.

The data written in the memories MEM1, MEM2 are read from each of the rows in the order shown by the direction B with the data of one row amount being set as one block. When the data are read by a row unit, the data are read alternately from the memories MEM1, MEM2 in the order according to the data block identification data $ID_B$ (00, 01, 02, 03, . . .). The data read out from the memory MEM1 and the memory MEM2 are supplied to an inner error code generating circuit 16.

Figure 5:
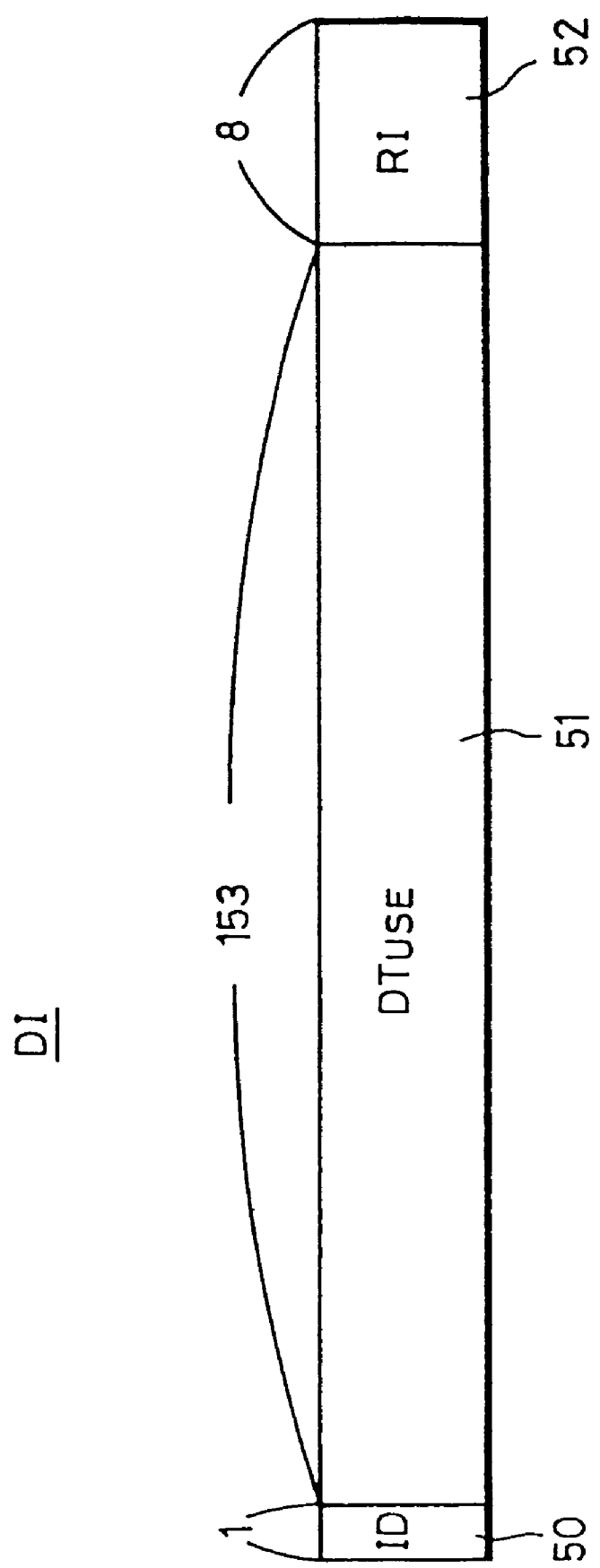
FIG. 5 is a diagram showing an inner data block D1 output from an inner error code generating circuit of the recording system of the data recorder used in the archive VTR of the embodiment of the recording apparatus and reproducing apparatus according to the present invention.

The inner error code generating circuit 16 generates, with respect to each of the input data blocks, parity codes $RI_0$ to $RI_{255}$ each formed of a 8-byte Reed-Solomon code as an inner error code 52 shown in FIG. 5, and adds the parity codes to an end of each of the data blocks. Then, the inner error code generating circuit supplies added data as inner data block $DI_0$ to $DI_{255}$ to a second multiplexer 17.

The second multiplexer 17 successively selects and outputs a preamble data PR and a postamble data PS generated by a preamble-portion and postamble-portion generating circuit 18 and the inner data block $DI_0$ to $DI_{255}$ output from the inner error code generating circuit 16. The preamble data PR, the inner error data blocks $DI_0$ to $DI_{255}$, and the postamble data PS are output in that order.

An output data from the second multiplexer 17 is supplied to a data dispersing circuit 19. The data dispersing circuit 19 disperses (randomizes) the data by exclusive-ORing 1 byte of each input data with a predetermined data.

The dispersed data are supplied to an 8-9 modulating circuit 20. The 8-9 modulating circuit 20 converts a data arrangement into that of 8 bits in order to remove a DC component of a signal waveform recorded on a magnetic tape 25 (to make a signal free from the DC component). An outline of this conversion is as follows.

In response to each value of the input data of 1 byte of 8 bits having 256 kinds of values, two kinds of 9-bit data are previously determined by the ID-1 format. These two kinds of 9-bit data are data whose CDSs (Codeword Digital Sums) are reverse to each other in positive and negative polarities.

The 8-9 modulating circuit 20 monitors a DSV (Digital Sum Variation) of the 9-bit data output in response to the input data, and selects either of the two kinds of 9-bit data having different CDS values so that the value of DSV should be converged. Thus, the input data having a 1-byte, i.e., 8-bit arrangement is converted into the data having the 9-bit arrangement free from the DC component.

The 8-9 modulating circuit 20 includes a circuit for converting an input data of NRZL (Nonreturn to Zero Level) format into that of NRZI (Nonreturn to Zero Inverse).

Output data from the 8-9 modulating circuit 20, i.e., the NRZI data having 9-bit arrangement are supplied to a third multiplexer 21. The third multiplexer 21 adds a synchronization code $SYNC_B$ having a fixed length of 4 bytes generated by a synchronization code generating circuit 22, to each data block of the inner data blocks $DI_0$ to $DI_{255}$ for generating synchronization blocks $BLK_0$ to $BLK_{255}$.

A code pattern of the synchronization code $SYNC_B$ is determined by the ID-1 format which prescribes that the data thereof recorded on the magnetic tape must have this code pattern.

Figure 6:
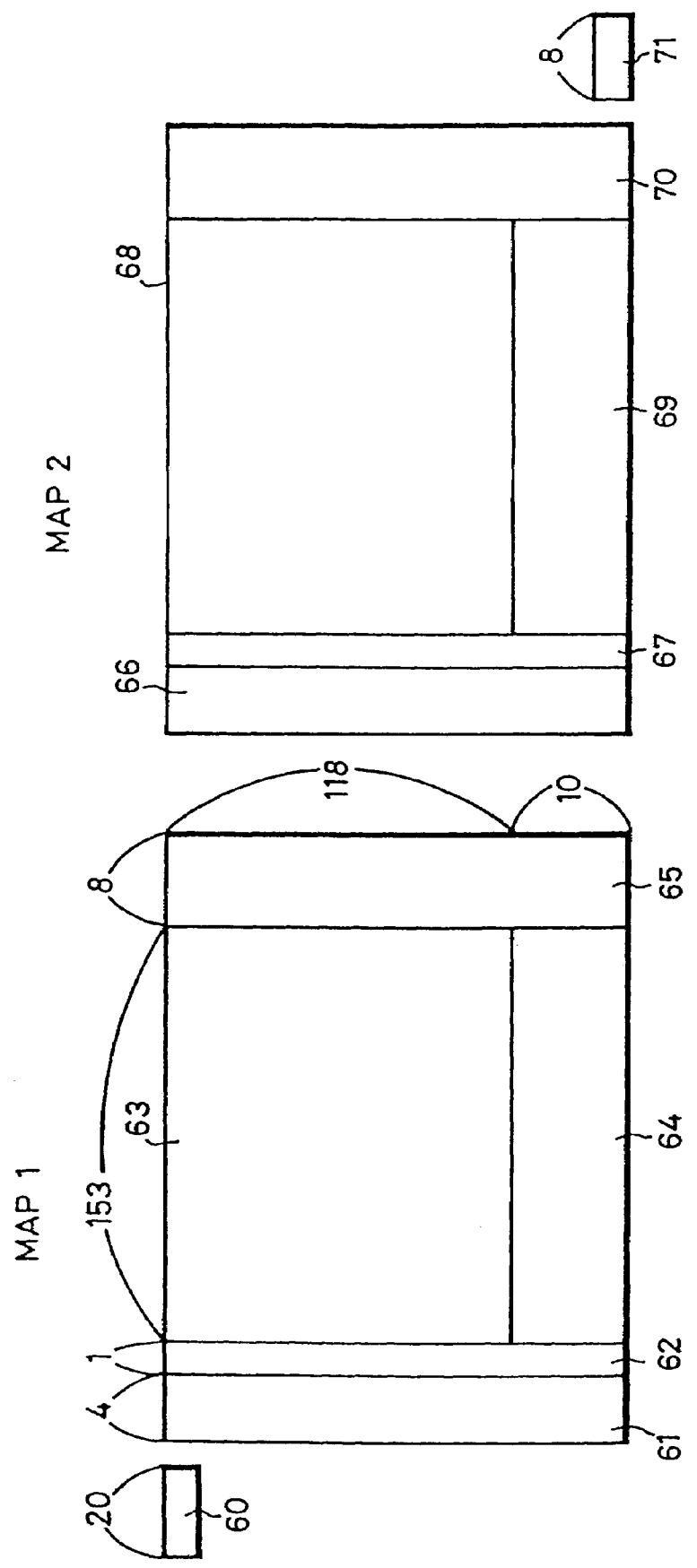
FIG. 6 is a diagram showing data maps MAP1, MAP2 output from a third multiplexer circuit of the recording system of the data recorder used in the archive VTR of the embodiment of the recording apparatus and reproducing apparatus according to the present invention.

The data obtained by these processings is shown in FIG. 6 which shows a map thereof. The output data from the third multiplexer 21 has a data arrangement obtained by scanning a map MAP1 and a map MAP2 in the lateral direction. In FIG. 6, reference numeral 60 depicts the preamble portion PR. Reference numerals 61, 66 depict the synchronization codes SYNC. Reference numerals 62, 67 depict the data block identification data ID. Reference numerals 63, 68 depict the information data. Reference numerals 64, 67 depict the outer error codes. Reference numerals 65, 70 depict the inner error codes. Reference numeral 71 depicts the postamble portion PS.

The output data from the third multiplexer 21 is supplied to a parallel-to-serial converting circuit 23. The parallel-to-serial converting circuit 23 converts the respective input data having a bit parallel arrangement of the preamble portion PR, the synchronization blocks $BLK_0$ to $BLK_{255}$ and the postamble portion PS into data $S_{REC}$ having a bit-serial arrangement.

The serial data $S_{REC}$ is amplified by a recording amplifier circuit 24 and then supplied as a recording signal to a magnetic head 26 for the helical scanning on the magnetic tape 25, thereby a recording track being formed on the magnetic tape 25.

Thus, the recording system of the data recorder adds the error correction code to the desired information data $DT_{USE}$ based on the Reed-Solomon product code system and then records the information data.

In this embodiment, an operator operates a control panel 27 to thereby set a data of a video-data compression rate N, a recording channel and a tape travel speed. The control panel 27 is an operation panel provided on the device 5 for inputting and setting the picture quality that the user desires the shown in FIG. 1A.

When the video-data compression rate N and the recording channel are recorded in the user bit on the time code track and the corresponding tape travel speed is properly calculated from the video-data compression rate N upon reproduction, the video-data compression rate N and the recording channel are set. Accordingly, the video-data compression rate N or data of the tape travel speed is supplied to a tape speed control unit 29 and a time code recording processing unit 28. The data of the recording channel is supplied to the time code recording processing circuit 28. The tape speed control unit 29 energize a driver 30 so as to control the tape travel speed based on the data of the tape travel speed calculated from the data of the tape travel speed or the video data compression rate N, thereby the tape being traveled at a predetermined speed. The time code recording processing unit 28 carries out, based on the data of the recording channel, data processing required before a time code head 31 records the video-data compression rate N and the recording channel in the user bit on the time code track of the magnetic tape 25.

Figure 7:
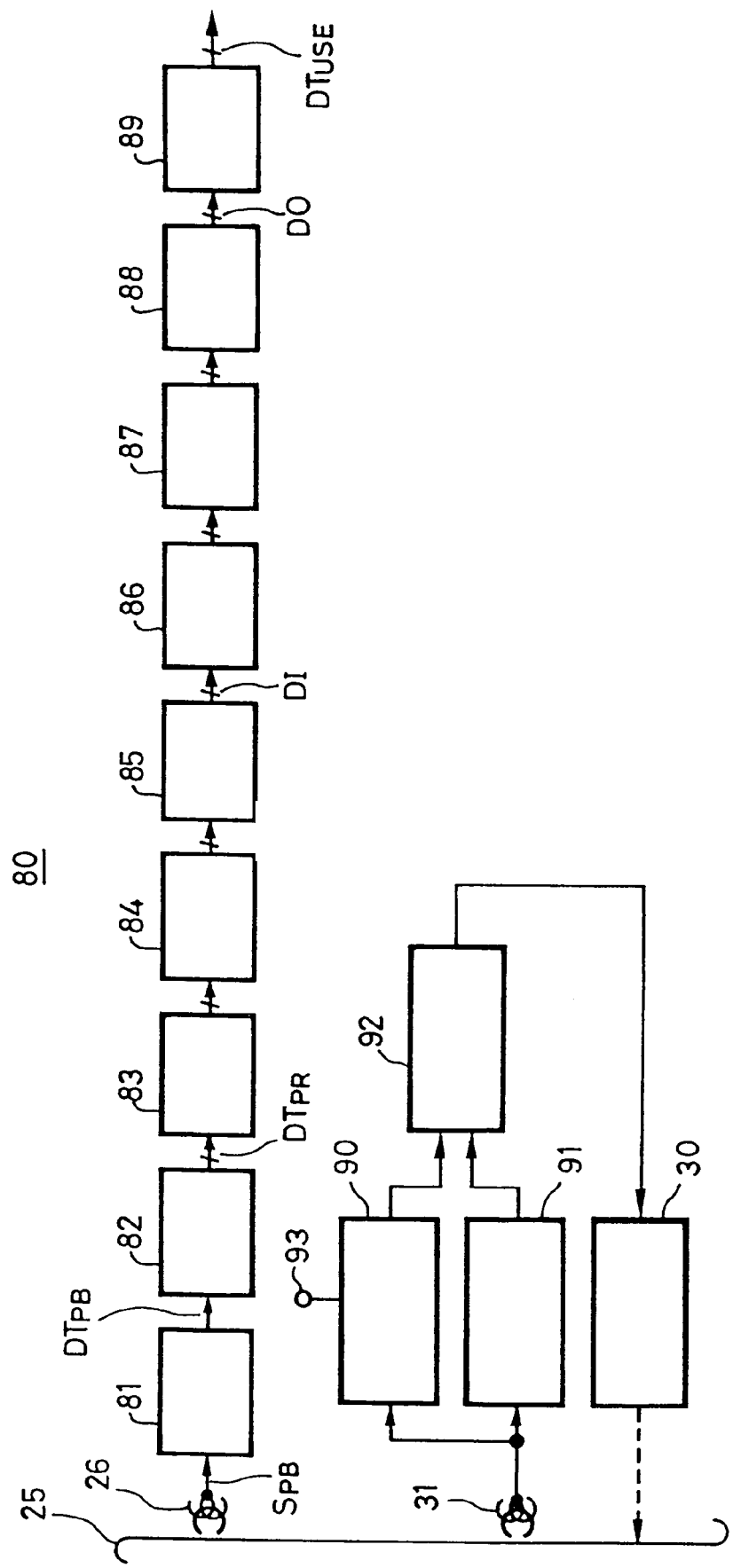
FIG. 7 is a block diagram of a reproducing system of the data recorder used in the archive VTR of the embodiment of the recording apparatus and reproducing apparatus according to the present invention.

The information data $DT_{USE}$ recorded on the magnetic tape by the recording system of such data recorder are reproduced by a reproducing system of the data recorder shown in FIG. 7. The reproducing system corresponds to the archive VTR 4 shown in FIG. 1B. The reproducing system carries out a signal processing completely reverse to that of the recording system shown in FIG. 2. Specifically, the reproducing system of this data recorder reads out recording tracks TR (..., TR1, TR2, TR3, TR4, ...) on the magnetic tape 25 as a reproduced signal $S_{PB}$ by using a magnetic head 26, supplying the reproduced signal to a reproduction amplifier circuit 81.

The reproduction amplifier circuit 81 includes an equalizer, a binarizing circuit and so on, and binarizes the supplied reproduced signal $S_{PB}$ to obtain a reproduced digital data $DT_{PB}$. Then, the reproduction amplifier circuit supplies the reproduced digital data to a serial-to-parallel converting circuit 82 at the succeeding stage. The serial-to-parallel converting circuit 82 converts the reproduced digital data $DT_{PB}$ of serial type into a 9-bit parallel data $DT_{PR}$.

A synchronization code detecting circuit 83 detects the synchronization code $SYNC_B$ of 4-byte length from a string of the parallel data $DT_{PR}$, and discriminates the synchronization block based on the synchronization code. The synchronization code detecting circuit includes a circuit for converting the parallel data $DT_{PR}$ of NRZI system into that of NRZL system.

An output data from the synchronization code detecting circuit 83 is supplied to an 8-9 demodulating circuit 84. The 8-9 demodulating circuit 84 restores the 9-bit data, which is obtained in the recording system by converting the 8-bit data for removing the DC component, to the 8-bit data again. The 8-9 demodulating circuit 84 is formed of a ROM (Read Only Memory) for converting the 8-bit data into the 9-bit data by a retrieval processing.

The data restored to that of 8 bits is subjected by a data integrating circuit 85 to an integration (de-randomizing) processing reverse to a processing of the recording system, i.e., the dispersing processing. This integration is achieved by exclusive-ORing the same predetermined data as that used for the dispersion processing and a data input to the data integrating circuit 85.

An inner code error correction circuit 86 subjects the inner data blocks $DI_0$ to $DI_{255}$ of discriminated synchronization blocks to error detection and error correction by using the respective 8-bit inner error codes $RI_0$ to $RI_{255}$ added to the blocks.

The inner data blocks $DI_0$ to $DI_{255}$ subjected to the inner code error correction is written in a memory having the same arrangement as that of the memory 14 of the recording system shown in FIG. 6, based on the 1-byte block identification data $ID_B$ detected by an identification data detecting circuit 87 and added to each of the blocks, with one data block being written in one row of the memory. The writing order is similar to the order of reading the data blocks from the memory 14 of the recording system, i.e., the inner data blocks are alternately written in a memory MEM1 and a memory MEM2 of the memory by a row unit in the order of the block identification data.

The data written in the respective memory MEM1 and memory MEM2 of the memory 88 are read out therefrom in the column direction in the same order as the order used when the data is written in the memory 14 of the recording system. As a result, the 128-byte length outer data block $DO_0$ to $DO_{305}$ are obtained again. An outer code error detection and correction circuit 89 subjects the outer data blocks $DO_0$ to $DO_{305}$ output from the memory 88 to error detection and error correction by using the respective 10-byte outer error codes $RO_0$ to $RO_{305}$ added to the data blocks. Thus, the information data $DT_{USE}$ recorded on the magnetic tape 25 are reproduced. The information data $DT_{USE}$ thus reproduced are supplied to the 1:N video-data compression decoder 6 shown in FIG. 1B.

In this embodiment, the time code head 31 reads the video-data compression rate N, the recording channel and the data of the tape travel speed recorded in the user bit on the time code track of the magnetic tape 25 on the predetermined recording channel.

When upon the recording the video-data compression rate N and the recording channel are recorded in the user bit of the time code track and upon the recording the corresponding tape travel speed is calculated from the video-data compression rate N, the time code head 31 reads the data of the video-data compression rate N and the recording channel.

Accordingly, the data of the video-data compression rate N read out by the time code head 31 are supplied to a video-data compression rate discriminating circuit 91. The data of the recording channel and the video-data compression rate N or the tape travel speed are supplied to a tape-travel-speed and channel discrimination control unit 90. The video-data compression rate discriminating circuit 91 supplies a tape-travel-speed change data to a tape-travel-speed changing means 92 based on the video-data compression rate N. The tape-travel-speed and channel discrimination control unit 90 supplies a tape-travel-speed change data to the tape-travel-speed changing means 92 based on the tape travel speed data calculated from the data of the tape travel speed or the video-data compression rate N. The tape-travel-speed changing means 92 energizes a driver 30, based on the tape-travel-speed change data, to control the tape travel speed, thereby travelling the magnetic tape 25 at a predetermined speed.

At this time, the video-data compression rate N discriminated by the video-data compression rate discriminating circuit 91 is supplied to the 1:N video-data compression decoder 6 shown in FIG. 1B.

The data of the channel input set by the device 8 for inputting and setting the channel that the user desires shown in FIG. 1B is supplied to an input terminal 93 provided in the tape-travel-speed and channel discrimination control unit 90. With this arrangement, the channel which the user desires may be designated by using the user bit on the time code to reproduce only a video data only on the designated channel.

The embodiment of the recording apparatus and the reproducing apparatus thus arranged according to the present invention is operated as follows. There will hereinafter be described an example of a data recorder DIR-1000 as the archive VTR 4 which changes the tape travel speed in response to the data recording speed. This data recorder DIR-1000 is developed by the applicant himself of the present invention and manufactured on the basis of an "ANSI ID-1" which is a common format in the world of a data recorder.

In this embodiment, an operation of recording a video data on one track in accordance with the ID-1 format will be described. FIG. 8A is a structural diagram of one track. As shown in FIG. 8A, 256 synchronization blocks 94 are recorded on one track, a preamble 93 and a postamble 94 being respectively recorded thereon before and after the synchronization blocks. 20 synchronization blocks of the 256 synchronization blocks 94 are those of the outer error codes.

The outer error codes are provided by the outer error code generating circuit 12 in the recording system shown in FIG. 2. The preamble 93 and the postamble 95 are generated by the preamble portion and postamble portion generating circuit 18 and added to the synchronization blocks 94 by the second multiplexer 17.

FIG. 8B is a structural diagram of one synchronization block. As shown in FIG. 8B, one synchronization block has data 98 of 153 bytes. A synchronization portion has data of 4 bytes. An ID portion 97 has data of 1 byte. An inner error code 99 has data of 8 bytes. Accordingly, information of 153×(256−20)=36,108 bytes are recorded on one track.

The inner error code 99 is provided by the inner error code generating circuit 16 of the recording system shown in FIG. 2.

FIG. 9 shows a relationship between a recording rate of the data recorder DIR-1000 and the tape travel speed. As shown in FIG. 9, when the recording rate is the highest value, i.e., 1, the tape travel speed is 423.8 [mm/s]. Hereinafter when the recording rate is ½, the tape travel speed is 211.9 [mm/s]. When the recording rate is ¼, the tape travel speed is 105.9 [mm/s]. When the recording rate is ⅛, the tape travel speed is 53.0 [mm/s]. When the recording rate is 1/16, the tape travel speed is 26.5 [mm/s]. When the recording rate is 1/24, the tape travel speed is 17.7 [mm/s]. When the recording rate is 1/32, the tape travel speed is 13.2 [mm/s]. Thus, the tape travel speed is changed at seven steps.

On the other hand, the recording rate of the data recorder DIR-1000 is 128 [Mbps] when the tape travel speed is 211.9 [mm/s]. Assuming that a tape length for the data recorder DI-1000 is 1,330 [m], it is possible to keep the recording time of about 100 [minutes].

FIG. 10 shows a relationship among the recording time, the compression rate and the tape travel speed. When the compression rate is 1, the tape travel speed is 211.9 [mm/s] and the recording time is 100 [minutes]. When the compression rate is ½, the tape travel speed is 105.9 [mm/s] and the recording time is 200 [minutes]. When the compression rate is ¼, the tape travel speed is 53.0 [mm/s] and the recording tim is 400 M[minutes]. When the compression rate is ⅛, the tape travel speed is 26.5 [mm/s] and the recording time is 800 [minutes]. When the compression rate is 1/12, the tape travel speed is 17.7 [mm/s] and the recording time is 1200 [minutes]. When the compression rate is 1/16, the tape travel speed is 13.2 [mm/s] and the recording time is 1600 [minutes].

When the source tape having the recording time of 100 [minutes] is used and the compression rate is 1/16, it is possible to store the contents of the 16 source tapes in one tape for the data recorder DIR-1000. It is possible to records the contents of the respective source tapes on one tape with different compression rates if the user desires.

On the other hand, since the compression technique is developed day by day, there may be employed a compression technique according to JPEG processing a still picture and allowing a transmission rate of 64 [kbps], a compression technique according to MPEG-I allowing the transmission rate of 1.5 [Mbps], and a compression technique according to MPEG-II allowing the transmission rate of 5 to 10 [Mbps]. In this case, the compression rate is higher than 1/100 and a picture quality obtained by such compression technique is practically satisfactory.

While in this embodiment the format of the video data is converted from an exiting format thereof to an archive format thereof by using the data recorder DIR-1000 as the archive VTR 4, it is needless to say that an exiting digital VTR (D1 or the like) other than the data recorder or a data recorder having a new archive format may be employed.

In the above embodiment, it is possible to process the video data derived from a broadcasting station by wireless, through a transmission line and so on. In this case, the video data may be supplied to the A/D converter 2 shown in FIG. 1A, or the compressed video data may be supplied directly to the archive VTR 4.

According to the above embodiment, since the picture compression rate is changed by the 1:N video-data compression encoder 3 as the video-data compression encoding means and the 1:N video-data compression decoder 6 as the video-data compression decoding means in response to the picture quality set by the device 5 for inputting and setting the picture quality that the user desires as the picture-quality setting means and the tape travel speeds of the archive VTR 4 as the recording means and the archive VTR 4 as the reproducing means are changed in accordance with the picture compression rate to thereby optionally set the tape travel speed higher or slower depending upon a level of the picture quality, it is possible to optionally select a tape storage space in response to the level of the picture quality.

Further, according to the above embodiment, the source reproducing VTR 1 as the video data supplying means reproduces the source tape by the VTR, it is possible to convert the exiting format of the existing source tape into the archive format thereof.

Also, according to the above embodiment, since the video data is transmitted through the transmission cable connected to a transmission source instead of the source reproducing VTR 1 as the video-data supplying means, it is possible to utilize the video data from various sources.

Furthermore, according to the above embodiment, since the video data is transmitted by wireless in the form of the radio wave from the transmission source instead of the source reproducing VTR 1 as the video-data supplying means, it is possible to utilize the video data from various sources.

Also, according to the above embodiment, since the archive VTR as the reproducing means 4 retrieves the reproduction channel by retrieving it in accordance with the data recorded in the user bit on the time code on the tape, even if the video picture is compressed, it is possible to designate the track and a time axis.

Figures 11A, 11B:
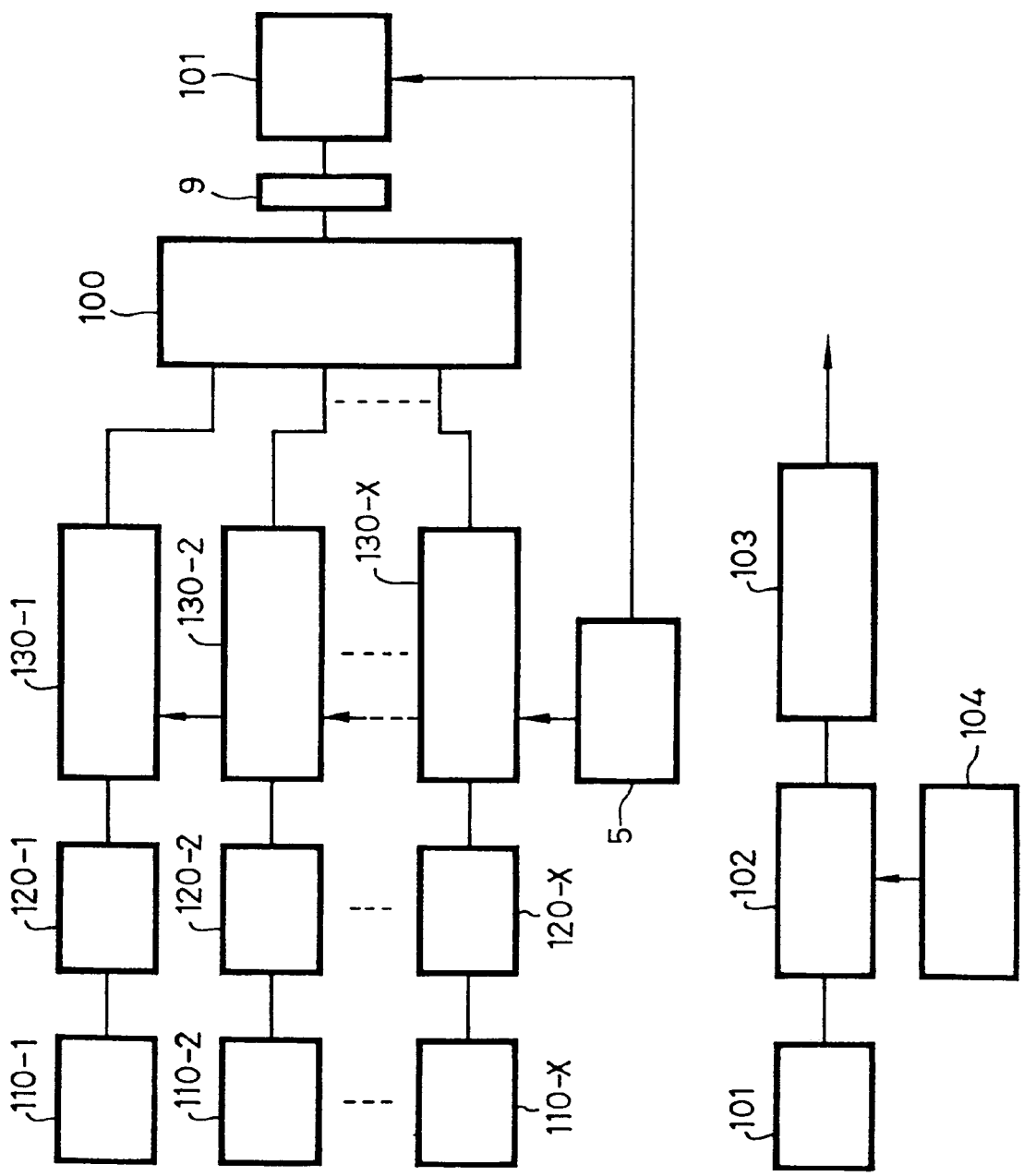
FIG. 11A is a block diagram of another embodiment of the recording apparatus according to the present invention.
FIG. 11B is a block diagram of another embodiment of the reproducing apparatus according to the present invention.

FIG. 11A is a block diagram of another embodiment of the recording apparatus according to the present invention. In FIG. 11A, a 1-inch omega VTR 110-1 as the source reproducing VTR reproduces an existing source tape in accordance with an existing format. An A/D converter 120-1 converts a video data reproduced by the source reproducing VTR 110-1 into a digital value.

A 1:N video-data compression encoder 130-1 is a bit-reduction encoder for compressing the video data at a rate of 1:N. (where N is a variable value and need not be an integer).

Similarly, a 1-inch omega VTR 110-2, an A/D converter 120-2 and a 1:N video-data compression encoder 130-2 are provided. X sets of the 1-inch omega VTR, the A/D converter and the 1:N video-data compression encoder are provided up to a 1-inch omega VTR 110-X, an A/D converter 120-X and a 1:N video-data compression encoder 130-X. Respective output signals from the 1:N video-data compression encoder 130-1, the 1:N video-data compression encoder 130-2, . . . , the 1:N video-data compression encoder 130-X are supplied to a multiplexer 100. The multiplexer 100 time-division multiplexes the respective output signals from the 1:N video-data compression encoder 130-1, the 1:N video-data compression encoder 130-2, . . . , the 1:N video-data compression encoder 130-X.

The video data multiplexed by the multiplexer 100 is supplied to an archive VTR 101 and recorded on the tape thereby. At this time, identification signals of respective source tapes reproduced by the 1-inch omega VTR 110-1, the 1-inch omega VTR 110-2, . . . , the 1-inch omega VTR 110-X are recorded on the tape. At this time, the identification signals may be recorded in the user bit on the time code track.

A formatter 9 converts a data format of the video data from the 1-inch omega VTR 110-1, the 1-inch omega VTR 110-2, . . . , the 1-inch omega VTR 110-X which are multiplexed by the multiplexer 100 into a data format of the archive VTR101. The formatter temporarily writes the video data of a converted format in a buffer memory incorporated therein and reads out the video data written in the buffer memory to supply the video data to the archive VTR101.

A data of a requested picture quality input by the device 5 for inputting and setting the picture quality that the user desires is supplied to the 1:N video-data compression encoder 130-1, the 1:N video-data compression encoder 130-2, . . . , the 1:N video-data compression encoder 130-X. The 1:N video-data compression encoder 130-1, the 1:N video-data compression encoder 130-2, . . . , the 1:N video-data compression encoder 130-X compress the data at the picture compression rate N corresponding to the requested picture quality. In accordance with this compression processing, the archive VTR 101 changes a tape speed in response to the picture compression rate N. The archive VTR 101 carries out, by simultaneously changing the tape speed and the drum rotation speed, the control for setting the frequency used for the reproduction the same as the tape recording frequency.

At this time, while it is not necessary to set the video-data compression rates N of the 1:N video-data compression encoder 130-1, the 1:N video-data compression encoder 130-2, . . . , the 1:N video-data compression encoder 130-X to the same value, they are usually set to the same value.

FIG. 11B is a block diagram showing another embodiment of a reproducing apparatus according to the present invention. In FIG. 11B, the archive VTR 101 reproduces a video data. The video data reproduced by the archive VTR 101 is supplied to a demultiplexer 102. At this time, each source is designated by using a desired-reproduction-source setting device 104, the identification signal of each of the designated source tapes is reproduced, the designated source is retrieved based thereon, and only the video data of the source tape of the multiplexed video data is output. A 1:N video-data compression decoder 103 is a decoder for N times expanding the video data compressed at the video-data compression rate N, for restoring the compressed video data supplied from the demultiplexer 102 to its original picture, whereby a reproduced video signal is obtained.

A compression technique is developed day and day. In the embodiment, a compression technique according to the MPEG-II is most efficient in compression of a moving picture. When this technique is used, signals including those of ten channels or larger can be recorded on and stored in one tape.

According to the above embodiment, the multiplexer 100 as the video-data multiplexing means adds the identification signals to a plurality of data and converts the plurality of data into a single data. The demultiplexer 102 as the video-data demultiplexing means discriminates, based on the identification signals, the video data of the source designated by the desired-reproduction-source setting device 104 as the reproduction-source designating means and outputs the video data to record the plurality of video data of the sources on one tape. The video data of the optional sources are designated and reproduced from one tape. Therefore, it is possible to reduce a tape storage space, and further it is possible to reduce a consumed amount of the tape.

FIG. 12 is a block diagram showing a recording apparatus of another embodiment of the recording apparatus and reproducing apparatus according to the present invention. In this embodiment, the channel number of the input video data is set to 16 channels, data of only one channel is recorded on each track and the data of the same channel is recorded on every sixteenth channels.

In FIG. 12, picture compression units 201A, 202A, 203A, . . . , 216A compress digital video signals of channels 1 to 16, and are formed of, for example, bit reduction encoders or the like. The digital video signals of channel channels 1 to 16 compressed by the picture compression units 201A, 202A, 203A, . . . , 216A are supplied to encoding units 201B, 202B, 203B, . . . , 216B.

The encoding units 201B, 202B, 203B, . . . , 216B generates error correction codes and so on for digital signal processings. In the digital signal processings, the signal of each channel is digitally processed, and the processings of the data of the respective channels are completely independent of one another.

The digital video signals of channels 1 to 16 encoded by the encoding units 201B, 202B, 203B, . . . , 216B are supplied to memory units 201C, 202C, 203C, . . . , 216C. The memory units 201C, 202C, 203C, . . . , 216C temporarily stores the digital video signals of channels 1 to 16.

Figure 14:
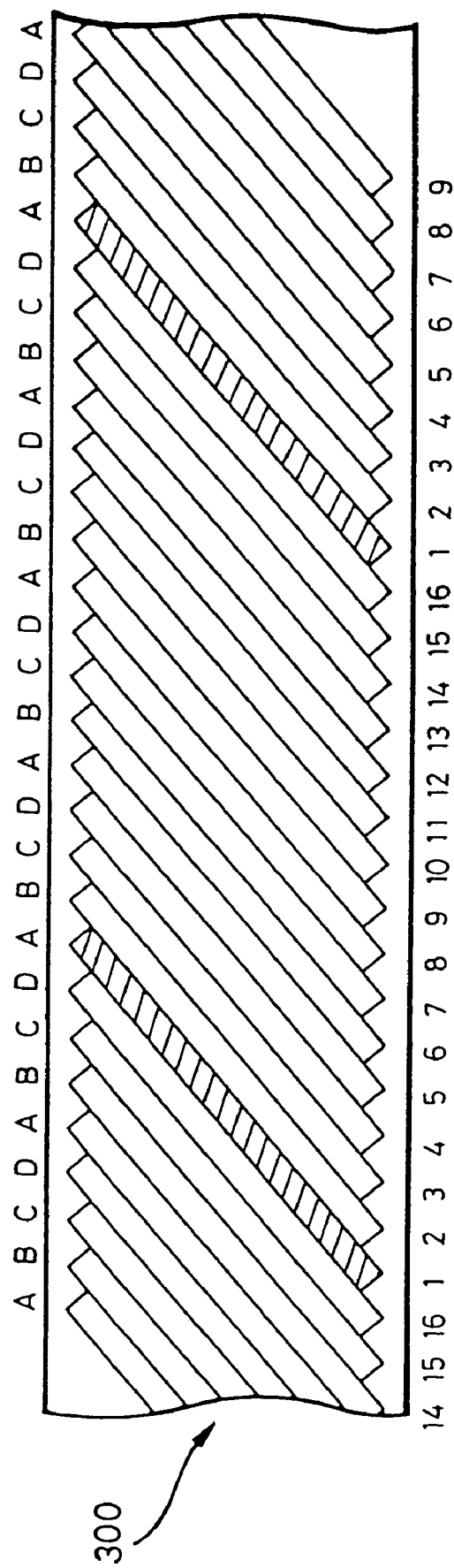
FIG. 14 is a diagram showing a track formed on a tape of another embodiment of the recording apparatus and reproducing apparatus according to the present invention.

The digital video signal stored in the memory units 201C, 202C, 203C, . . . , 216C are supplied to a signal selection unit 217. A recording-signal timing control unit 218 controls the memory units 201C, 202C, 203C, . . . , 216C and the signal selection unit 217. FIG. 14 shows a track formed on the tape according to an embodiment of the recording apparatus and reproducing apparatus of the present invention. A track 300 is successively formed in a tape length direction. Signals for respective channels are output to recording heads A, B, C, D so that the signal of the same channel should be recorded on every sixteenth tracks. The recording heads record the signals on a tape traveled by a tape drive unit, not shown, in accordance with a recording format of the above tracks.

In this embodiment, when the channel number of the input video data is sixteen and the video-data compression rates of the picture compression units 201A, 202A, 203A, . . . , 216A are ¹⁄₁₆, an archive VTR can record the video data at one-fold speed. When the channel number of the input video data is sixteen and the video-data compression rates of the picture compression units 201A, 202A, 203A, . . . , 216A are ¹⁄₃₂, the archive VTR can record the video data at ½-fold speed.

In this embodiment, since the data obtained when the tape is traveled by an amount of 16 tracks is recorded on one track, it is sufficient for each of the memory units 201C, 202C, 203C, . . . , 216C to have a capacity twice as much as the data of one track amount. At this time, when the number of the recording heads A, B, C, D is the same as the channel number, it is unnecessary to provide the signal selection unit 217 shown in FIG. 12 and signals output from the memory units 201C, 202C, 203C, . . . , 216C may be supplied to the recording heads A, B, C, D as they are and recorded on the tape.

However, when the number of the recording heads A, B, C, D are larger than the channel number, it is physically difficult to mount the drum with the recording heads which are as much as the channel number, and this arrangement costs very high. Therefore, in general, the number of the recording heads A, B, C, D is properly set to about 8 to 16.

Figure 15:
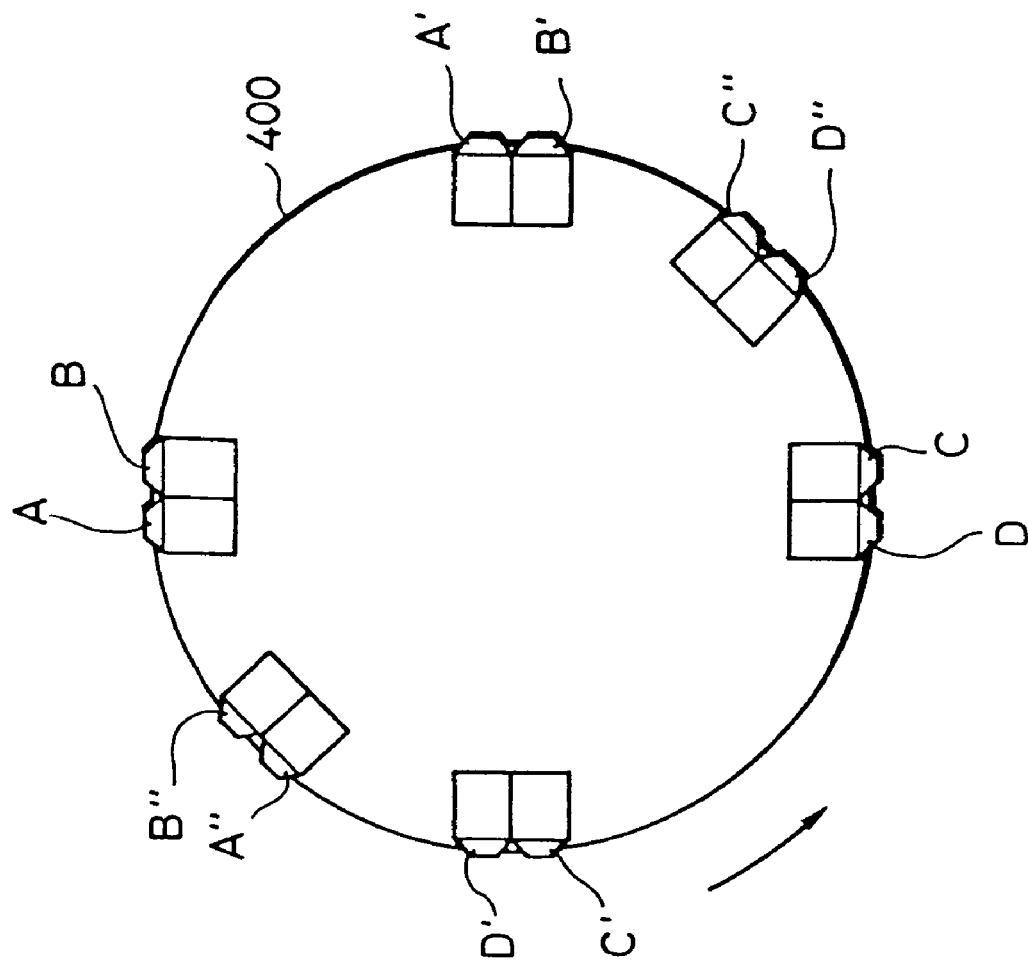
FIG. 15 is a diagram showing a four-head system drum of another embodiment of the recording apparatus and reproducing apparatus according to the present invention.

In this embodiment, as shown in FIG. 15, a drum of four-head system is employed. In order to record data of four channels, the recording heads A, B, C, D are provided with the recording heads A, B for 2 channels and the recording heads C, D for 2 channels being respectively paired and the respective two pairs of the recording heads A, B and C, D being provided at an outer peripheral end portion of a drum 400 so as to oppose to each other at an angle of 180°. In order to reproduce data of four channels, reproducing heads A', B', C', D' are provided with the reproducing heads A', B' for 2 channels and the reproducing heads C', D' for 2 channels being respectively paired and the respective two pairs of the reproducing heads A', B' and C', D' being provided at the outer peripheral end portion of the drum 400 so as to oppose to each other at an angle of 180°.

The recording heads A, B and C, D are respectively provided at positions preceding to those of the reproducing heads A', B' and C', D' by 90° in the rotation direction of the drum 400 shown by an arrow in the figure. This arrangement allows the reproducing heads A', B' and C', D' to reproduce the data for monitoring at the same time when the recording heads A, B and C, D record the data, i.e., to serve as so-called confidence heads. Erase heads A", B" and C", D" are respectively provided at positions preceding to the recording heads A, B and C, D by 45° in the rotation direction of the drum 400 shown by the arrow in the figure.

Figure 18:
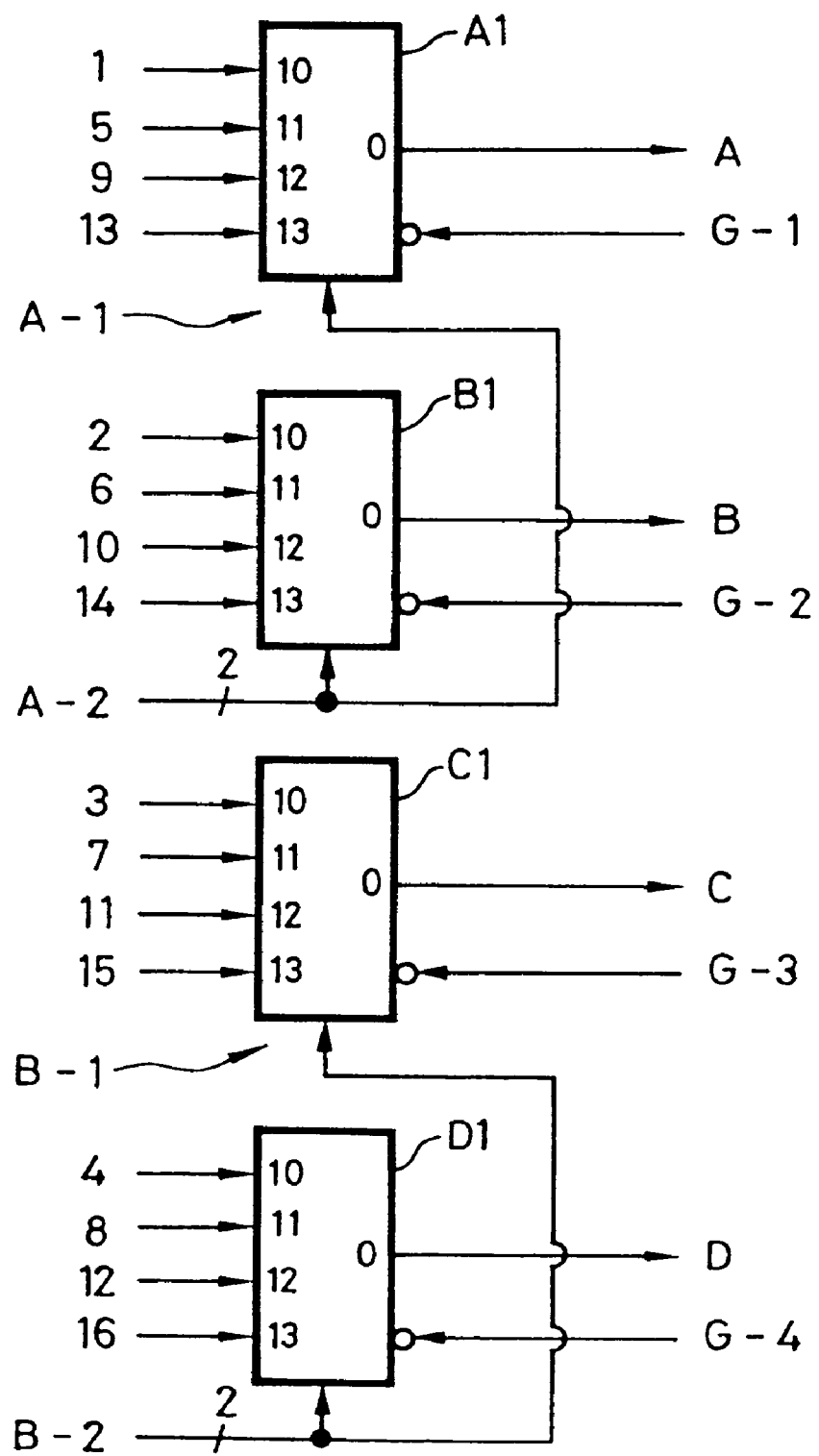
FIG. 18 is a detailed block diagram showing a signal selection unit of the recording apparatus of another embodiment of the recording apparatus and reproducing apparatus according to the present invention.

FIG. 18 is a detailed block diagram of the signal selection unit 217. A recording signal selection unit A1 supplies a single recording signal of the compressed data of respective channels 1, 5, 9, 13 to the recording head A based on a recording gate signal G-1 from the recording head A and a recording selection signal A-1 from the recording-signal timing control unit 218. A recording signal selection unit B1 supplies a single recording signal of the compressed data of respective channels 2, 6, 10, 14 to the recording head B based on a recording gate signal G-2 from the recording head B and a recording selection signal A-2 from the recording-signal timing control unit 218.

A recording signal selection unit C1 supplies a single recording signal of the compressed data of respective channels 3, 7, 11, 15 to the recording head C based on a recording gate signal G-3 from the recording head C and a recording selection signal B-1 from the recording-signal timing control unit 218. A recording signal selection unit D1 supplies a single recording signal of the compressed data of respective channels 3, 7, 11, 15 to the recording head D based on a recording gate signal G-4 from the recording head D and a recording selection signal B-2 from the recording-signal timing control unit 218.

Figure 19:
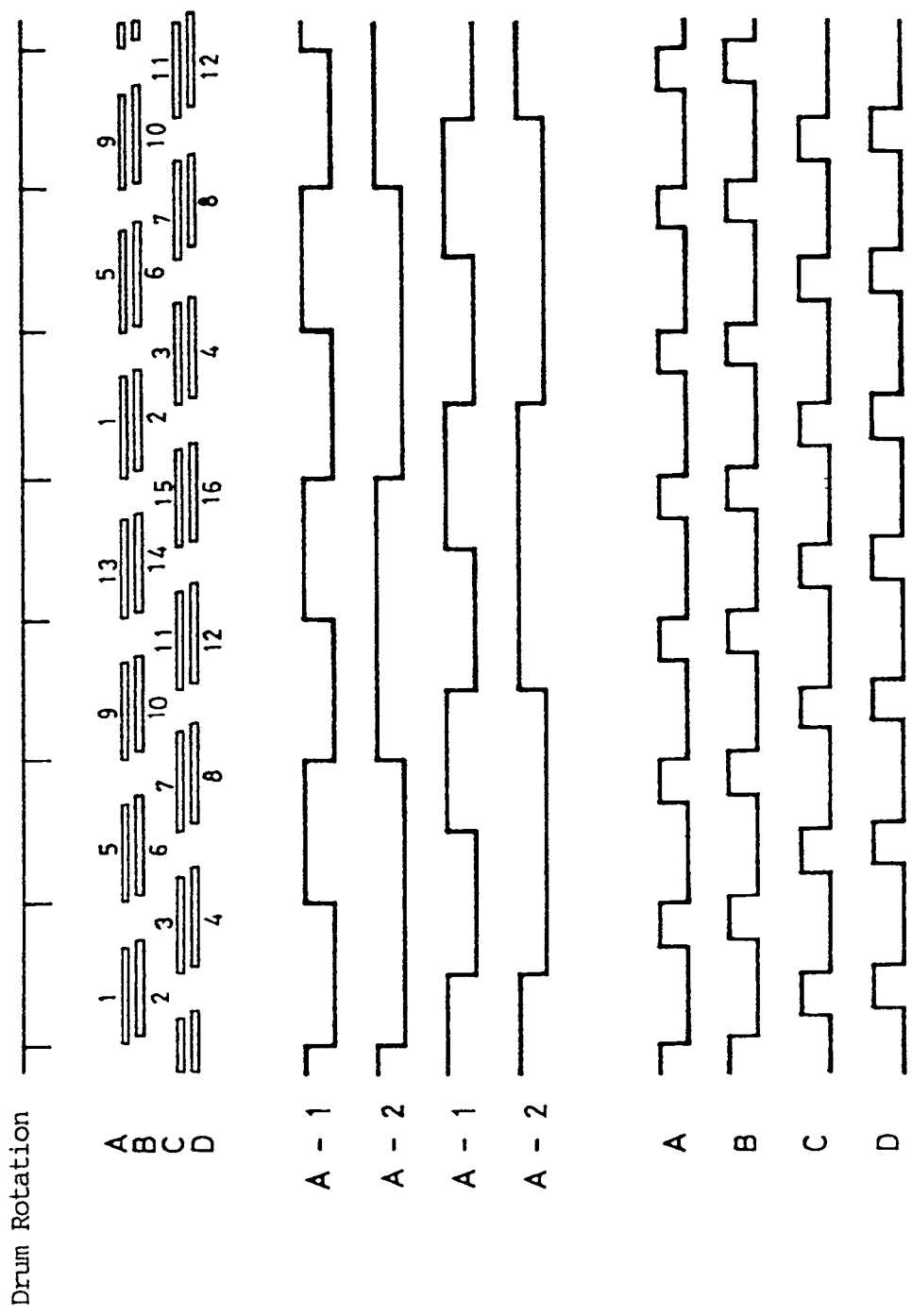
FIG. 19 is a timing chart of control of the signal selection unit of the recording apparatus of another embodiment of the recording apparatus and reproducing apparatus according to the present invention.

FIG. 19 shows a timing chart of control of the signal selection unit 217. As the drum is rotated, the recording heads A, B and C, D as two pairs are respectively rotated. Thus, the recording heads A, B and C, D record the data on the tracks for respective channels based on the recording selection signals A-1, A-2, B-1 and B-2 and the gate signals.

As described above, the data for channels to be recorded by the recording heads are input to the recording signal selection units for respective recording heads, and a signal output from each of the signal selection units is selected based on the recording selection signal. Since it is sufficient for each of the selection units to select one output signal from the four input signals, this selection can be controlled by using the 2-bit selection signal. In this embodiment, while each pair of the recording heads A, B and C, D is controlled by using the same selection signal, only the selection signal of one system is required when the track is formed during a half rotation of the drum.

At this time, assuming that the number of the channels on which the single head records data, i.e., the number of the channels on which the single head records the data at the same time is 4, it is sufficient for each of the picture compression units 201A, 202A, 203A, . . . , 216A, the encoding units 201B, 202B, 203B, . . . , 216B, and the memory units 201C, 202C, 203C, . . . , 216C shown in FIG. 12 to have processing units for 4 channels of 16 channels.

If the timing signal is controlled, then it is sufficient to provide the recording signal selection unit shown in FIG. 18 of one channel amount. Specifically, when a compression VTR capable of recording data of 16 channels with using four heads records the data of four channels in each of four recording operations, the recording signal selection unit may have input processing units for four channels and a recording processing unit for one channel.

Figure 13:
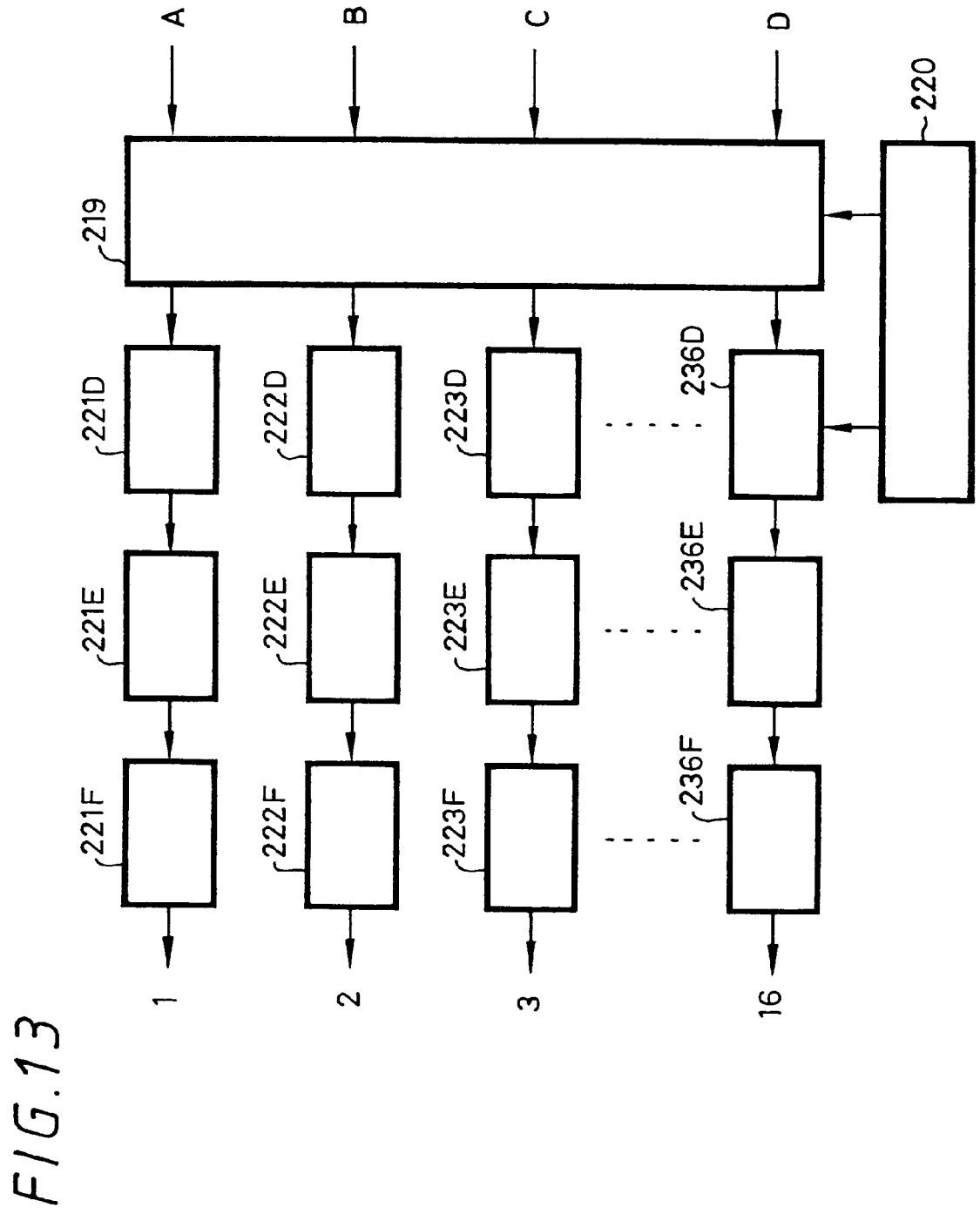
FIG. 13 is a block diagram of the reproducing apparatus of another embodiment of the recording apparatus and reproducing apparatus according to the present invention.

FIG. 13 is a block diagram showing a reproducing apparatus of the embodiment of the recording apparatus and reproducing apparatus according to the present invention. As shown in FIG. 13, signals reproduced by reproducing heads A, B, C, D are divided by a signal dividing unit 219 into the signals for the respective channels 1 to 16.

The signals for the respective channels 1 to 16 obtained by dividing the signals by the signal dividing unit 219 are supplied to memory units. The memory units 221D, 222D, 223D, ..., 236D store the respective signals to adjust phases of output signals. These controls are carried out by a reproduced-signal timing control unit 220.

The output signals from the memory units 221D, 222D, 223D, ..., 236D are supplied to decoding units 221E, 222E, 223E, ..., 236E, respectively. The decoding units 221E, 222E, 223E, ..., 236E carry out signal processing such as error correction or the like.

The respective signals subjected by the decoding units 221E, 222E, 223E, ..., 236E to the error correction are supplied to picture expanding units 221F, 222F, 223F, ..., 236F. The picture expanding units 221F, 222F, 223F, ..., 236F carry out signal processings for restoring the supplied signals to their original pictures. Thus, the digital video signals of the respective channels 1 to 16 are output.

In this embodiment, since the video signals for sixteen channels can be simultaneously recorded, a time required for the recording is reduced to a time which is 1/16 time as much as a time required for the successive recording. Since the data for the respective channels are not mixed on the track, if the reproducing VTRs of the number which is less than sixteen, e.g., four are provided when data of the sixteen recorded tape are compressed and recorded, it is possible to easily record the data of all the sixteen recorded tapes by repeatedly recording data of four channels at each of four recording operations.

Specifically, the data may be recorded, for example, such that at the first recording, signals for channels 1, 5, 9, 13 are supplied to four VTRs and only these signals are recorded thereon and hereinafter the data for channels 2, 6, 10, 14, for channels 3, 7, 11, 15 and for channels 4, 8, 12, 16 are successively recorded.

Figure 16:
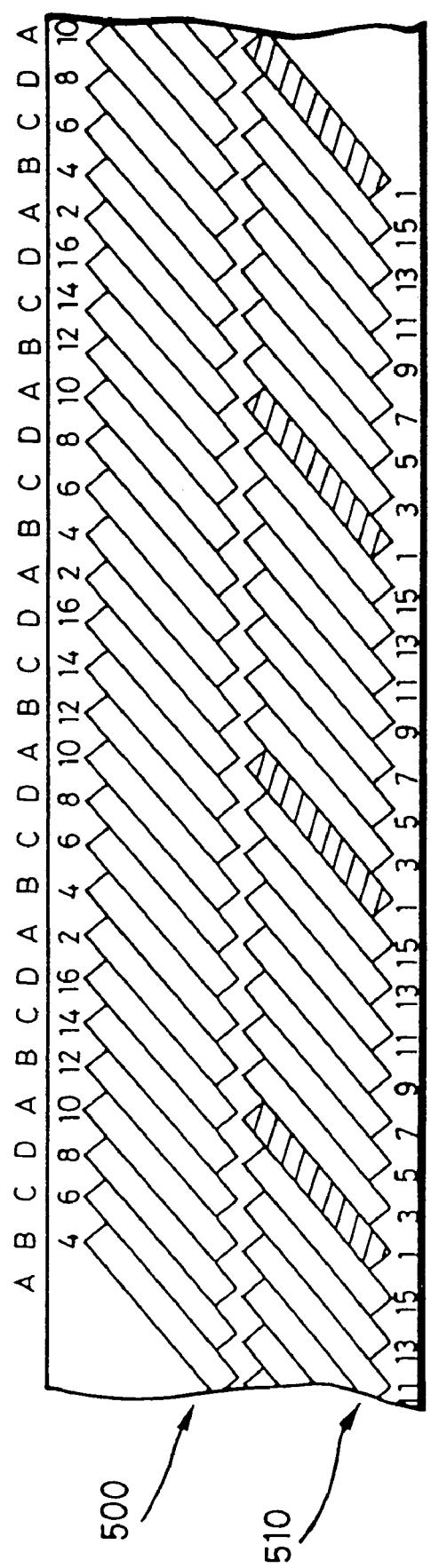
FIG. 16 is a diagram showing a track formed on a tape of another embodiment of the recording apparatus and reproducing apparatus according to the present invention.

Tracks may be formed as shown in FIG. 16 by respectively providing an upper track 500 and a lower track 510 in the tape width direction with tracks for even-numbered channels and tracks for odd-numbered channels being respectively formed on the upper track 500 and the lower track 510.

In this case, a space used for edition may be provided between the data of the respective channels, a circuit for controlling a timing of the edition being provided similarly to the recording-signal timing control unit 218 shown in FIG. 12.

If it is easy to edit the channels as described in the above embodiment, each of the signal processings can flexibly be carried out without preparing the reproducing apparatus of the number equal to the channel number.

When so-called DT (dynamic tracking) heads used for variable-speed reproduction by changing a head height by its bimorph structure are employed as the reproducing heads A, B, C, D shown in FIG. 15, it is possible to reproduce the recorded data of optional channels at high speed without changing the drum rotation speed upon the high-speed reproduction.

In the above embodiment, if heads capable of independently scanning tracks apart from each other by sixteen tracks are employed as the four reproducing heads A, B, C, D, it is possible to reproduce the data of the four optional channels of the sixteen channels at the four-fold speed.

While the tape is usually traveled by four-track amounts during one drum rotation upon the normal reproduction, the tape is travelled by sixteen-track amounts when the data is reproduced at the four-fold speed. The four independent DT heads capable of independently scanning tracks apart from each other by sixteen tracks can reproduce the data of the four optional tracks of the sixteen tracks, i.e., the data of four channels during one rotation. Accordingly, it is possible to continuously reproduce the data of four channels at the four-fold speed.

These heads are effective when the compressed data are transferred for dubbing to a recording apparatus capable of high-speed recording such as a disk recording apparatus or the like. In this case, the data may be output from the decoding units 221E, 222E, 223E, ..., 236E shown in FIG. 13.

If the picture expanding units 221F, 222F, 223F, ..., 236F shown in FIG. 13 can process the data at four-fold speed, it is possible to reproduce the original picture at four-fold speed. However, it is difficult to expand the data at high speed with a general technique at present.

However, when the data is compressed by a certain unit, if each of the capacities of the memory units 221D, 222D, 223D, ..., 236D shown in FIG. 13 is larger than the unit of the data, then it is possible to reproduce the original picture at four-fold speed by distributing the reproduced data to the memories of the reproducing systems having the channels not used for reproduction upon the reproduction at four-fold speed and carrying out the decoding and picture-expanding processings by the decoding units 221E, 222E, 223E, ..., 236E and the picture expanding units 221F, 222F, 223F, ..., 236F of those channels to synthesize the signals output therefrom.

Figure 17:
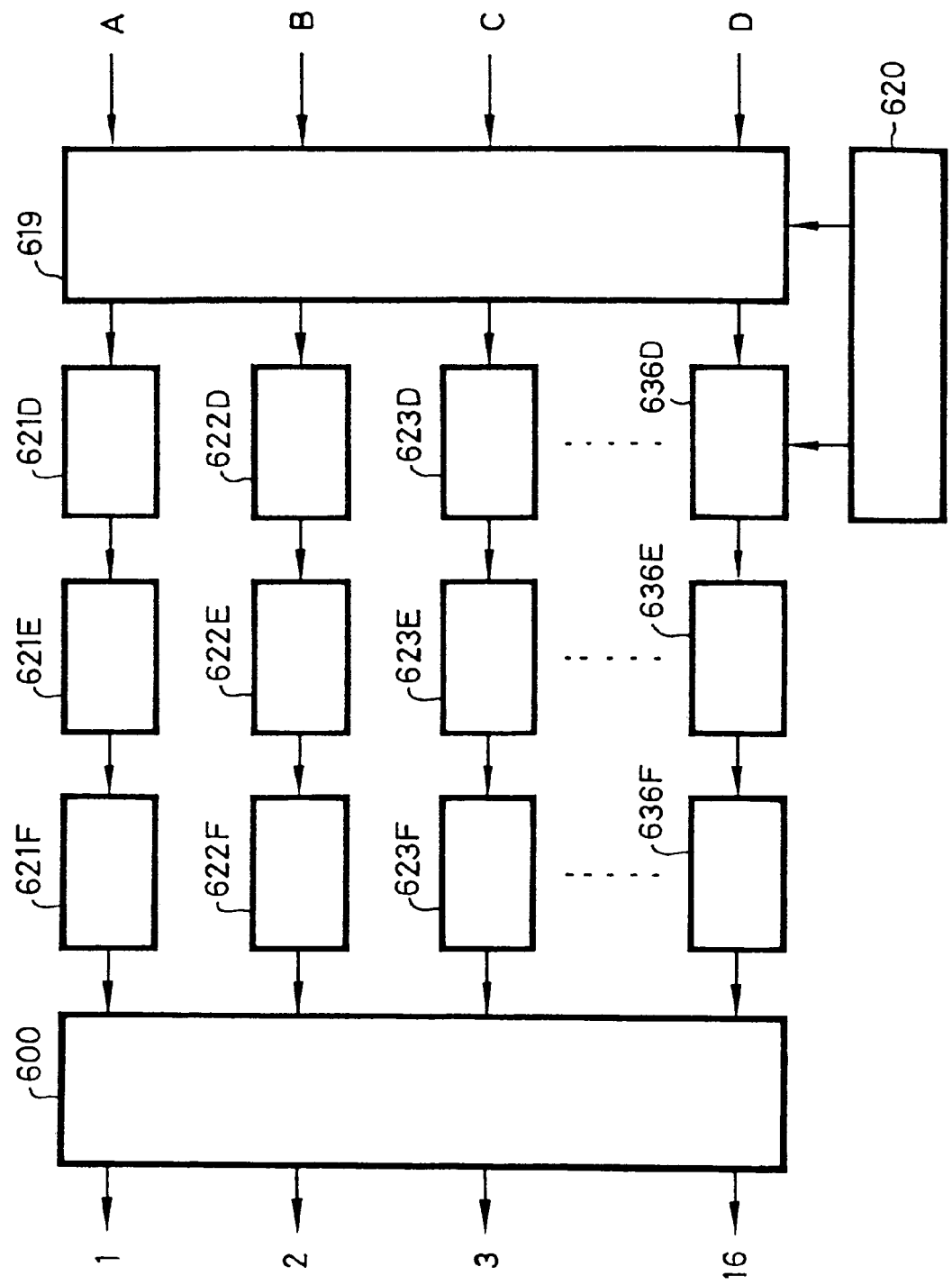
FIG. 17 is a block diagram showing a reproducing apparatus of another embodiment of the recording apparatus and reproducing apparatus according to the present invention.

A reproducing apparatus used in this case is arranged as shown in FIG. 17. In FIG. 17 which is a block diagram of the reproducing apparatus, the reproducing apparatus is different from that shown in FIG. 13 in that a signal synthesizing unit 600 is provided at the succeeding stage of the picture expanding units. At this time, if the pictures of every fourth frames are successively output, for example, then the reproducing apparatus is effective in the high-speed search mode. A memory for storing data of a data-compression unit is provided in each of the picture expanding units, the data being divided into those of respective channels at the succeeding stages of the decoding unit.

In this embodiment, when each of data strings can be recorded for two hours, if a data string is desired to be recorded for a time more than two hours, then it is possible to easily record the data up to four hours by recording the data on two tracks of the sixteen tracks.

Thus, it is possible to effectively, drastically reduce a storage space by compressing and storing a large amount of data such as those of a library in a broadcasting station. If the above recording system is employed as a backup of a disk apparatus for recording the compressed data or the like, then even when a part of the data of the disk is broken, it is possible to restore the broken data within a short period by using the high-speed dubbing.

In FIG. 12, the picture compression units 201A, 202A, 203A, . . . , 216A may employ the compression technique according to JPEG dealing with the still picture and allowing the transmission rate of 64 [kbps], the compression technique according to MPEG-I allowing the transmission rate of 1.5 [Mbps] and the compression technique according to MPEG-II allowing the transmission rate of 5 to 10 [Mbps]. In this case, the compression rate is more than $\frac{1}{100}$, and the picture quality of the compressed data is practically satisfactory. In this embodiment, the MPEG-II is most efficient in compression of the moving picture. Use of this compression technique allows the signals of ten channels or more to be recorded on and stored in one tape.

In this embodiment, the video data transmitted from the broadcasting station in the form of a radio wave or derived through a transmission cable or the like can be used as the digital video signals for channels 1 to 16. In this case, A/D converters may be provided at the preceding stages of the picture compression units 201A, 202A, 203A, . . . , 216A shown in FIG. 12, for inputting an analog video signal to the former. The video data previously compressed may be supplied directly to the encoding units 201B, 202B, 203B, . . . , 216B.

In the above embodiment, a digital VTR may be employed as the archive VTR using the recording heads A, B, C, D and the reproducing heads A, B, C, D to record the video data. Since the compressed video data is recorded and reproduced, it is sufficient that it can be used as the data recorder.

According to the above embodiment, since the track 300 is formed in the tape length direction in response to each channel for a data string obtained from the digital video signals as the video data and the tracks 300 are independently formed at a predetermined constant interval by recording data by the plurality of recording heads A, B, C, D, data of the plurality of tracks 300 can be simultaneously recorded and reproduced, and data of a part of the tracks 300 can easily be recorded after other tracks are used for the recording.

According to the above embodiment, when the number of the channels 1 to 16 of the digital video signals as the video data is larger than the number of the plurality of recording heads A, B, C and D, each of the recording heads A, B, C, D records data strings of specific channels of the channels 1 to 16 on the specific plural tracks 300 of the tracks 300 each corresponding to each of the channels 1 to 16 and formed in the tape length direction. Therefore, it is possible for each of the recording heads A, B, C, D to record the data of specific channels of the channels 1 to 16 on the corresponding tracks 300 within one recording operation.

According to the above embodiment, when the number of the channels 1 to 16 of the digital video signals as the video data is larger than the number of the plurality of recording heads A, B, C and D, the data strings of the digital video signals are recorded and the tracks 300 are formed in the tape length direction and the tape width direction to record the data of the specific channels of the channels 1 to 16 on the corresponding plural tracks 300. Therefore, it is possible to simultaneously record the data by the recording heads A, B, C, D of the small number even if the data has a large number of channels.

According to the above embodiment, since the plurality of recording heads A, B, C, D simultaneously record a plurality of data strings on the tracks 300 and the plurality of reproducing heads A', B', C' and D' reproduce the data recorded on the plurality of tracks 300 at a speed multiplied by a predetermined number by setting the rotation speed of the drum 400 constant, it is possible to reduce the recording time, and further it is possible to reproduce the data recorded on the optional tracks 300 on the tape at high speed.

According to the above embodiment, since the plurality of recording heads A, B, C, D are provided so as to record the data of four channels with two recording heads thereof being paired respectively and one pair of the recording heads A, B and the other pair of recording heads C, D being provided at the outer peripheral end portion of the drum 400 so as to oppose to each other at the angle of 180° and the plurality of reproducing heads A', B', C', D' are provided so as to reproduce the data of four channels with two reproducing heads thereof being paired respectively and one pair of the reproducing heads A', B' and the other pair of reproducing heads C', D' being provided at the outer peripheral end portion of the drum 400 so as to oppose to each other at the angle of 180°, it is possible to record the data of the channels of the four's multiple during a plurality of rotation of the drum 400 by recording the data of four channels per one rotation of the drum 400.

According to the above embodiment, since the recording timing control unit 218 as the recording timing control means for controlling the timing used for recording the digital video signal as the video data of the channels 1 to 16 compressed by the picture compression units 201A, 202A, 203A, . . . , 216A on the tape is provided between the picture compression units 201A, 202A, 203A, . . . , 216A as the video-data compression means and the plurality of recording heads A, B, C, D and the respective tracks 300 where the data strings of the same channel are recorded at an interval of the predetermined tracks are formed under the control of the recording timing control unit 218, it is possible to allocate the channel of a predetermined number to each of the tracks 300.

According to the above embodiment, when the number of the plurality of reproducing heads A', B', C', D' is four and the number of the tracks 300 for a plurality of data strings is 16 tracks, each of the reproducing heads A', B', C', D' scans the every sixteenth tracks, thereby the data recorded on the tracks of four optional channels of the 16-channel tracks being reproduced at four-fold speed. Therefore, the data of the four optional tracks of the 16 tracks, i.e., the data of four channels can be reproduced per one rotation of the drum 40, which allows the continuous reproduction at four-fold speed.

INDUSTRIAL APPLICABILITY

The recording apparatus and the reproducing apparatus according to the present invention are suitable for the archive recording and reproducing apparatus for keeping a source tape retained for reproduction in a broadcasting station or the like.

The invention claimed is:

1. A recording apparatus comprising:
   a video-data supply means for supplying video data that originated from a plurality of source mediums;
   a compression means for compressing said video data;
   a setting means for setting a compression rate used in said compression means;
   a control means for controlling a travel speed of a recording medium so that said recording medium should be traveled at a speed corresponding to said compression rate set by said setting means;
   a recording means for recording said video data compressed by said compression means on said recording medium, wherein said control means controls a speed of said recording medium so that a value of the compression rate set by said setting means and the speed of said recording medium are proportional to each other, wherein said control means controls the speed of said recording medium so that, when the compression rate set by said setting means is an inverse number of N, where N is an integer greater than 1, the speed of said recording medium is set to a speed multiplied by an inverse number of N, said recording means further recording on said recording medium compression rate data indicating said compression rate of said video data compressed by said compression means; and wherein the recording media is tape-type media.

* * * * *

UNITED STATES PATENT AND TRADEMARK OFFICE
CERTIFICATE OF CORRECTION

| | |
|---|---|
| PATENT NO. | : 7,218,843 B2 |
| APPLICATION NO. | : 11/118522 |
| DATED | : May 15, 2007 |
| INVENTOR(S) | : Hiroki Kotani et al. |

It is certified that error appears in the above-identified patent and that said Letters Patent is hereby corrected as shown below:

Title page, item (30)   Foreign Application Priority Data, enter

February 2, 1994   (JP).............P6-011161
February 10, 1994   (JP).............P6-016709

Signed and Sealed this

Seventh Day of August, 2007

JON W. DUDAS
*Director of the United States Patent and Trademark Office*